(12) United States Patent
Schuknecht et al.

(10) Patent No.: US 11,973,460 B2
(45) Date of Patent: Apr. 30, 2024

(54) MOUNTING BRACKET

(71) Applicant: ARRAY TECHNOLOGIES, INC., Albuquerque, NM (US)

(72) Inventors: Nathan Schuknecht, Golden, CO (US); Lucas Creasy, Scottsdale, AZ (US); Jason Addink, Gilbert, AZ (US); Andrew Chase, Chandler, AZ (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 106 days.

(21) Appl. No.: 17/315,285

(22) Filed: May 8, 2021

(65) Prior Publication Data

US 2021/0351738 A1 Nov. 11, 2021

Related U.S. Application Data

(60) Provisional application No. 63/022,319, filed on May 8, 2020.

(51) Int. Cl.
*H01L 31/042* (2014.01)
*F24S 25/20* (2018.01)
*H02S 30/10* (2014.01)

(52) U.S. Cl.
CPC .............. *H02S 30/10* (2014.12); *F24S 25/20* (2018.05)

(58) Field of Classification Search
CPC ................................. H02S 30/10; F24S 25/20
See application file for complete search history.

(56) References Cited

U.S. PATENT DOCUMENTS

| | | | |
|---|---|---|---|
| 8,567,134 B1 | 10/2013 | Grushkowitz et al. | |
| 9,276,521 B2 | 3/2016 | Reed et al. | |
| 10,069,455 B2 | 9/2018 | Corio et al. | |
| 10,256,768 B2 | 4/2019 | Owen et al. | |
| 10,536,109 B2 | 1/2020 | Corio | |
| 2011/0138599 A1* | 6/2011 | Bellacicco | F24S 25/632 439/529 |
| 2017/0250648 A1 | 8/2017 | Haas et al. | |
| 2017/0310273 A1* | 10/2017 | Almy | F24S 25/632 |

OTHER PUBLICATIONS

International Search Report and Written Opinion dated Aug. 13, 2021, in related PCT Application No. PCT/US2021/031449.

* cited by examiner

*Primary Examiner* — Thanh Truc Trinh
(74) *Attorney, Agent, or Firm* — MASCHOFF BRENNAN

(57) ABSTRACT

A mounting bracket assembly comprising may include an upper region with flat portions on either end that interface with a photovoltaic (PV) module and a lower portion in between the flat portions, and a central portion at least partially surrounding a hole shaped to accommodate a torsion beam. The mounting bracket assembly may also include side portions extending from the ends of the upper region to below the hole shaped to accommodate the torsion beam, and a first outer lining along a periphery of the mounting bracket assembly. The mounting bracket assembly may also include a second outer lining along the hole shaped to accommodate the torsion beam, and multiple ribs extending between the first outer lining and the second outer lining.

12 Claims, 18 Drawing Sheets

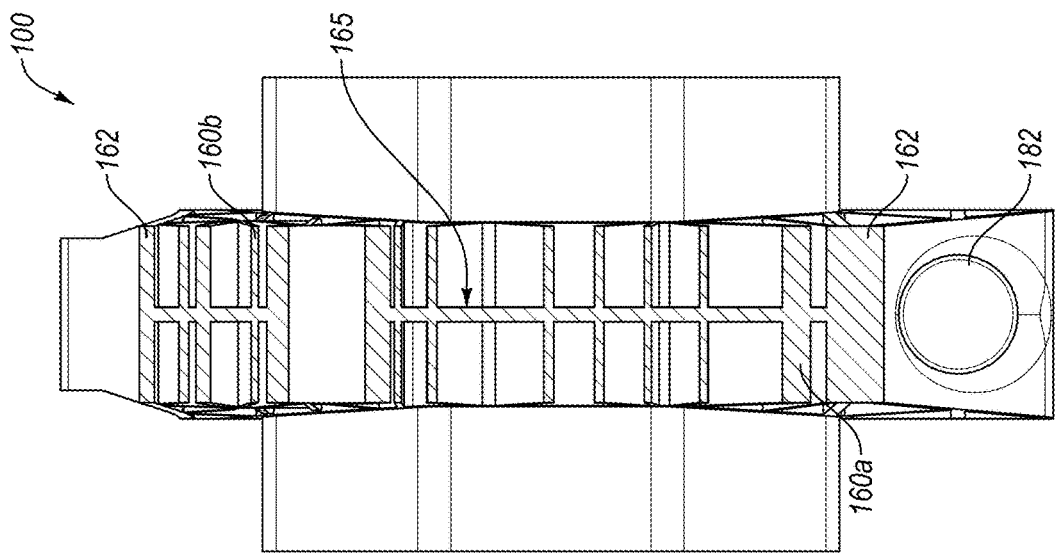
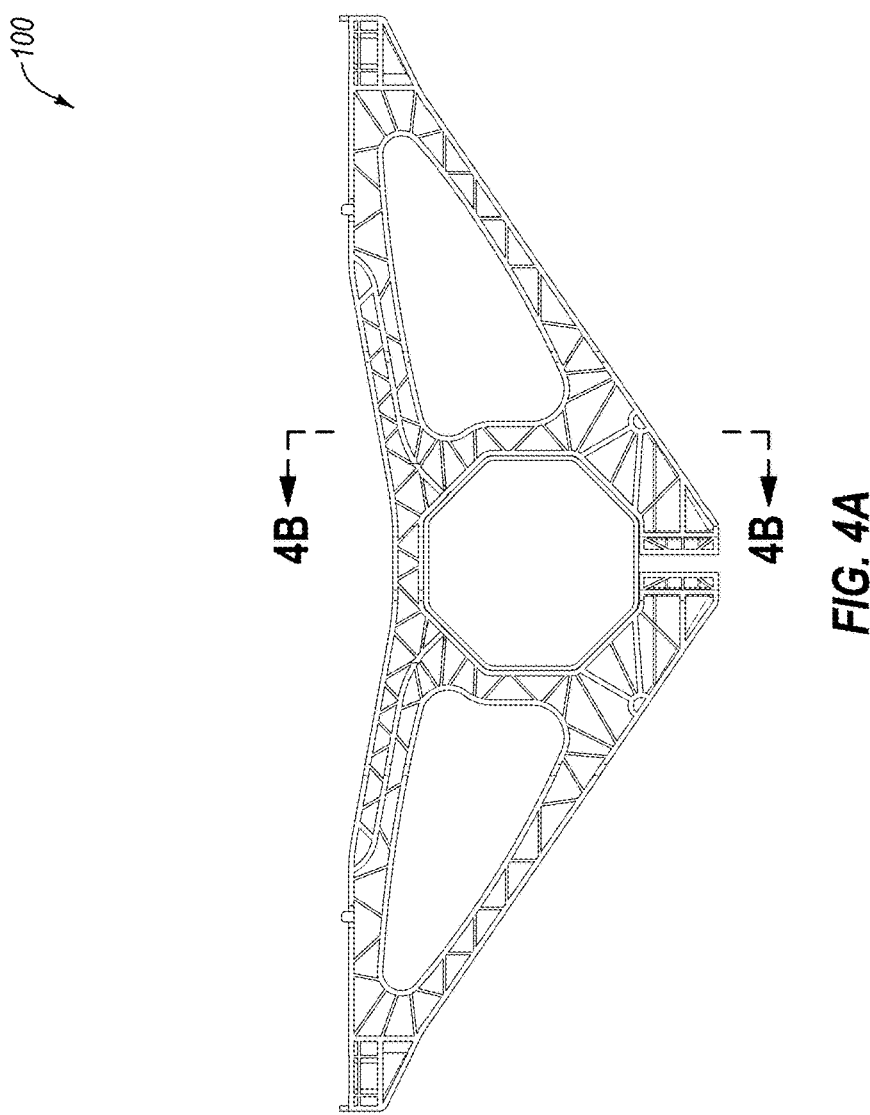
FIG. 4B
FIG. 4A

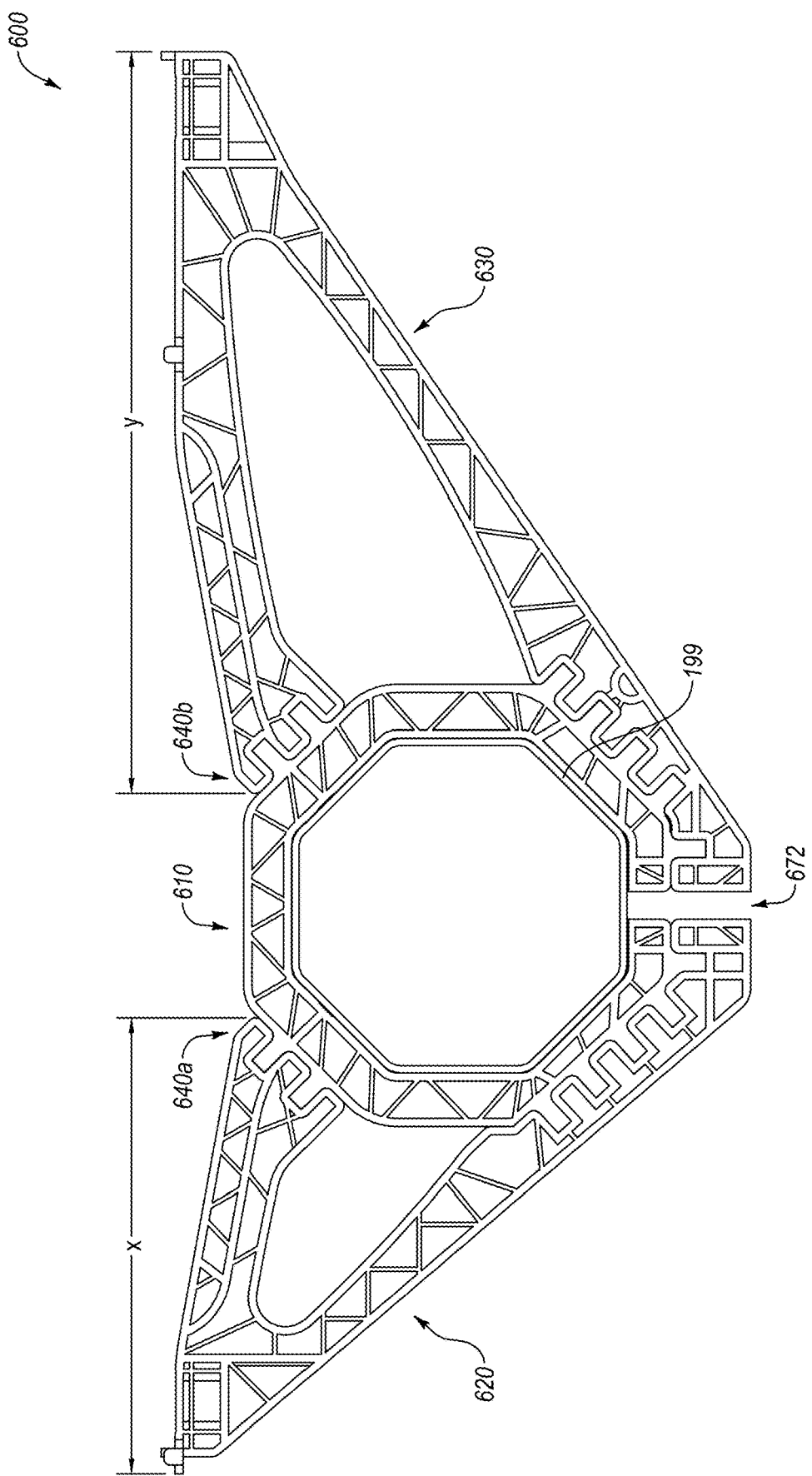

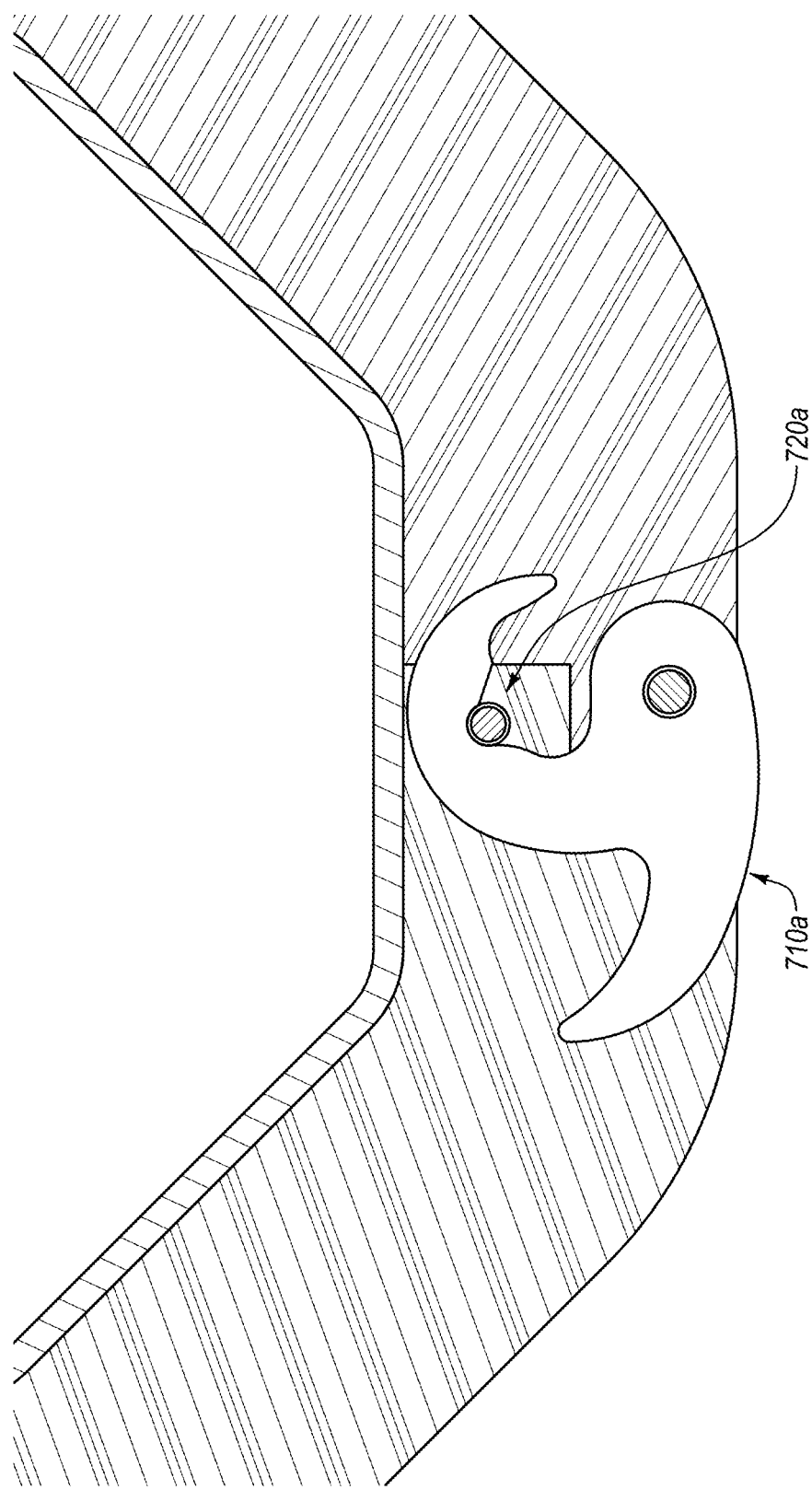

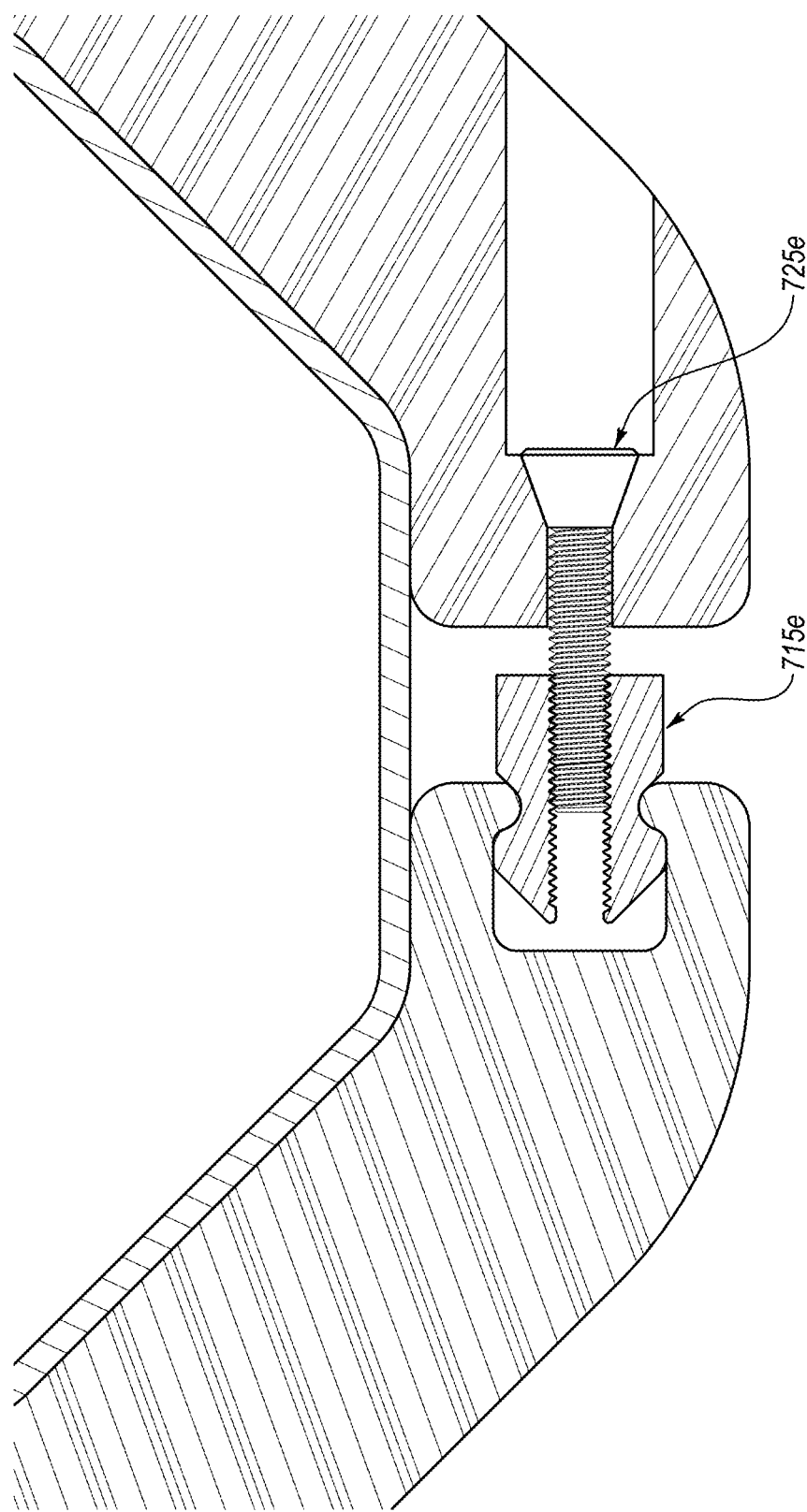

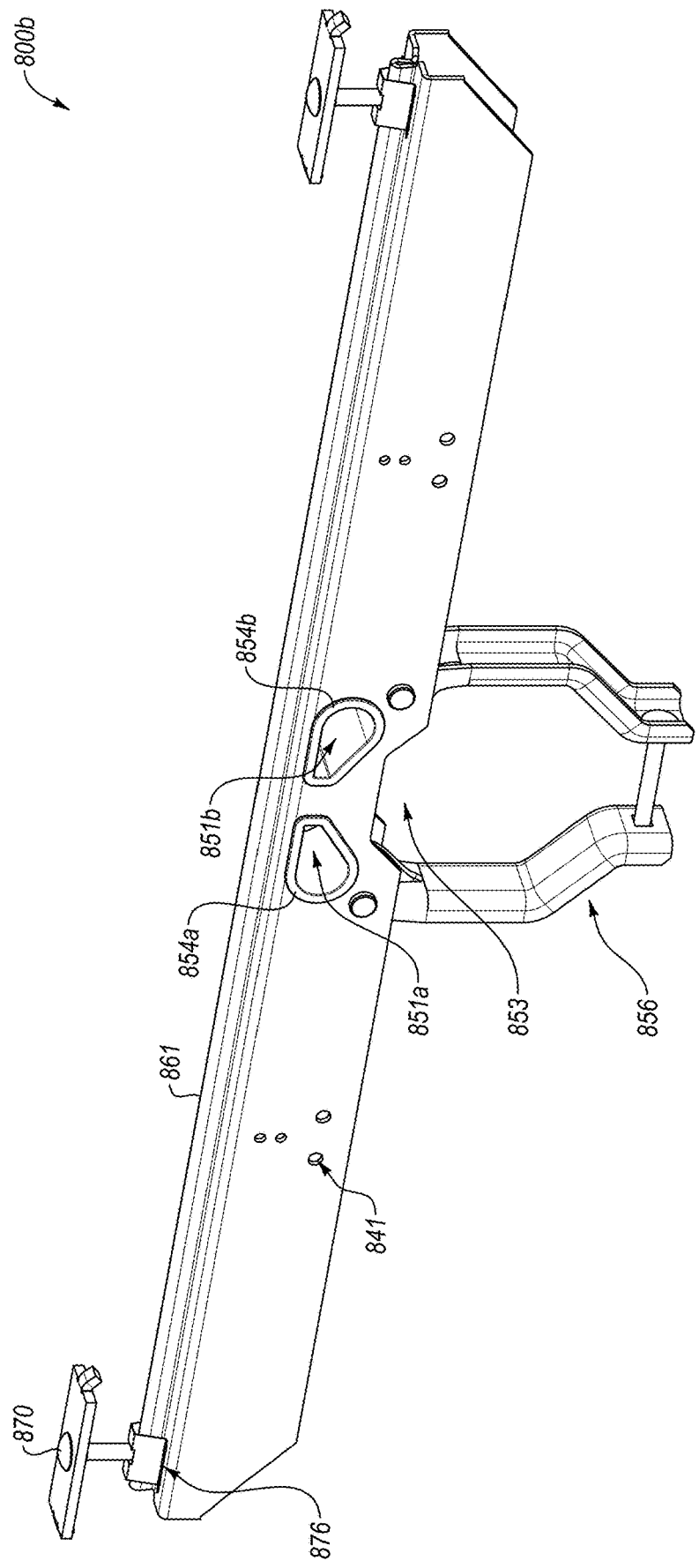

MOUNTING BRACKET

CROSS-REFERENCE TO RELATED APPLICATION

This application claims the benefit of U.S. Patent Application Ser. No. 63/022,319, filed on May 8, 2020; the disclosure of which is incorporated herein by reference in its entirety.

1. THE FIELD OF THE DISCLOSURE

The present disclosure relates to a mounting bracket.

2. THE RELEVANT TECHNOLOGY

The present disclosure relates to mounting hardware for photovoltaic systems.

Most photovoltaic ("PV") modules are quite heavy because they use glass to encase the PV cells. A solar mounting system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. This can require motors with significant power. Therefore, mounting and tracking systems for PV modules typically are relatively large, complex assemblies comprising large, heavy components.

These components can add significant cost to a solar power system for at least two reasons. First, the components themselves are expensive to manufacture, ship, and install. Second, installation and operation can be expensive because they require time and skilled operators to conduct quality control measures in the field. Therefore, there is a need for PV mounting system components that minimize the overall use of material to be lighter weight and reduce costs. In addition, there is a need for PV mounting system components that can reduce the time necessary for installation and for quality control during construction in the field.

Furthermore, today a number of PV systems use modules that have custom frames or unframed modules. Depending on whether the PV modules use standard frames or these other variations, different components and designs are needed for the mounting and tracking systems. Thus, there is a need for a PV mounting system having a base design capable of mounting PV modules using standard frames, custom frames, and even unframed modules.

Accordingly, there is a need for PV mounting system components that efficiently use structural material only where it is needed. There is also a need for a PV mounting system with components that provide easier and quicker installation and quality control capability. Finally, there is a need for a PV mounting system capable of mounting modules using standard frames, custom frames, and even unframed modules.

The subject matter claimed herein is not limited to embodiments that solve any disadvantages or that operate only in environments such as those described above. Rather, this section is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One embodiment of the present disclosure may include a mounting bracket assembly comprising may include an upper region with flat portions on either end that interface with a photovoltaic (PV) module and a lower portion in between the flat portions, and a central portion at least partially surrounding a hole shaped to accommodate a torsion beam. The mounting bracket assembly may also include side portions extending from the ends of the upper region to below the hole shaped to accommodate the torsion beam, and a first outer lining along a periphery of the mounting bracket assembly. The mounting bracket assembly may also include a second outer lining along the hole shaped to accommodate the torsion beam, and multiple ribs extending between the first outer lining and the second outer lining.

One or more of any of the preceding mounting bracket assemblies may further include first metal sleeves within the flat portions, shaped and positioned to accommodate bolts for coupling the mounting bracket assembly to the PV module.

One or more of any of the preceding mounting bracket assemblies may further include a second metal sleeve within the side portions, shaped and positioned to accommodate at least one bottom bolt for coupling the mounting bracket assembly to the torsion beam.

One or more of any of the preceding mounting bracket assemblies may further include a conductive component within the mounting bracket assembly that may be exposed along at least one of the flat surfaces and exposed within the hole shaped to accommodate the torsion beam, and may be in electrical communication therebetween.

In accordance with one or more of any of the preceding mounting bracket assemblies, the first outer lining and second outer lining may be a continuous lining that meet at a gap in the central portion.

One or more of any of the preceding mounting bracket assemblies may further include a tool-less fastener that may be disposed at a meeting of the side portions below the central portion.

In accordance with one or more of any of the preceding mounting bracket assemblies, the tool-less fastener may include a post and cam locking mechanism.

One or more of any of the preceding mounting bracket assemblies may further include a single bolt, and a first eared clamp that includes a first sloping surface, where the first sloping surface may be shaped to interface with an outer surface of a first side portion of the side portions proximate the upper region. The first eared clamp may include a first top ear, shaped and positioned to provide downward force against the PV module, and a first receiving region through which the single bolt passes. The mounting bracket assembly may also include a second eared clamp that includes a second sloping surface, where the second sloping surface may be shaped to interface with an outer surface of a second side portion of the side portions proximate the upper region such that as the single bolt is tightened, the first and the second eared clamps slide downward along the first and the second side portions. The second eared clamp may include a second top ear, shaped and positioned to provide downward force against the PV module, and a second receiving region through which the single bolt passes.

One or more of any of the preceding mounting bracket assemblies may further include generally triangular-shaped gaps in material between the upper region, the side portions, and the central portion.

In accordance with one or more of any of the preceding mounting bracket assemblies, a first side of the upper region may extend further away from the central portion than a second side of the upper region such that the first side and the second side of the upper region are asymmetrical.

One or more embodiments of the present disclosure may include a mounting bracket assembly that may include a body that may include a gap in the body shaped to interface with and match at least a portion of a profile of a torsion beam such that the torsion beam extends at least partway into the body when disposed within the gap and may be flush against at least a portion of the gap. The body may also include a ridge along a top edge of the body, and two shelves from which the ridge may extend upwards, where the two shelves may be disposed on either side of the body and may be shaped to have photovoltaic (PV) modules rest thereon while the PV modules abut against the ridge.

One or more of any of the preceding mounting bracket assemblies may further include a pair of module locating tabs extending outwards from the shelves and protruding upwards and positioned to interface with a hole or gap in a frame of the PV module.

In accordance with one or more of any of the preceding mounting bracket assemblies, the pair of module locating tabs may be spaced apart a standardized distance corresponding to distance between holes in the PV module, where the spacing may include one of 400 mm apart, 600 mm apart, 800 mm apart, or 1000 mm apart.

In accordance with one or more of any of the preceding mounting bracket assemblies, the pair of module locating tabs may include an accessory that is attached to the mounting bracket assembly.

In accordance with one or more of any of the preceding mounting bracket assemblies, the pair of module locating tabs may be formed as part of the body.

In accordance with one or more of any of the preceding mounting bracket assemblies, the ridge may include a profile that extends directly upwards from the two shelves.

One or more of any of the preceding mounting bracket assemblies may further include a hole in the body above the receiving portion sized to permit wires to pass therethrough.

One or more of any of the preceding mounting bracket assemblies may further include a lip on one or both of an edge of the gap or an edge of the hole.

In accordance with one or more of any of the preceding mounting bracket assemblies, the body may be made of a single sheet of metal.

One or more embodiments of the present disclosure may include a system that includes multiple photovoltaic (PV) modules that may be positioned along multiple rows and may be coupled to a torsion beam for each of the rows, where each of the rows may be movable via a motor to adjust an orientation of the torsion beam and thereby an orientation of a given row of the rows of PV modules. The system may also include multiple mounting bracket assemblies for coupling the PV modules to the torsion beams, where each of the mounting bracket assemblies may include an upper region with flat portions on either end that may interface with the PV module and a lower portion in between the flat portions. The mounting bracket assemblies may also include a central portion at least partially surrounding a hole shaped to accommodate the torsion beam, and side portions extending from the ends of the upper region to below the hole shaped to accommodate the torsion beam. The mounting bracket assemblies may also include a first outer lining along a periphery of a respective mounting bracket assembly, a second outer lining along the hole shaped to accommodate the torsion beam, and ribs extending between the first outer lining and the second outer lining.

Additional features and advantages of the disclosure will be set forth in the description which follows, and in part will be apparent from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which:

FIG. 4A is a front view of the mounting bracket assembly of FIG. 1;

FIG. 4B is a cut away view of the mounting bracket assembly of FIG. 1;

FIG. 6 illustrates another example embodiment of a mounting bracket assembly in accordance with the present disclosure;

FIGS. 7A-7E illustrate various views of potential connecting mechanisms associated with a mounting bracket assembly in accordance with the present disclosure;

FIGS. 8D and 8E illustrate various views of an additional example embodiment of a mounting bracket assembly in accordance with the present disclosure;

The figures also include a gray-scale version of the Figures in duplicate.

DETAILED DESCRIPTION

The present disclosure relates to variations in mounting bracket assemblies. In some circumstances, the mounting bracket assembly may be made of plastic or another low-cost material that is easier to work with and less expensive than metal. However, such materials have not traditionally been used in mounting bracket assemblies because of the damage caused by ultraviolet (UV) rays, because of the difficulties in designing and/or constructing a mounting bracket assembly with sufficient material strength, etc. The present disclosure provides examples of ways in which these difficulties may be overcome such that plastic (including those reinforced with fibers, carbon black, etc.) may be used as the material for the mounting bracket assembly. In some embodiments, the plastic may be injection-molded plastic, reaction injection molded (RIM plastic, and/or rotational molded plastic, that may or may not include one or more inserts to create the mounting bracket assembly.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as examples, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

In general, embodiments of the present disclosure relate to mounting bracket assemblies, mounting assembly components, systems and associated methods. Example embodiments make efficient use of structural material by using a flexible structural piece to secure an electricity generating device. An electricity generating device could be any kind of device that directly or indirectly converts solar radiation to electricity or collects, reflects, or concentrates solar radiation, including photovoltaic cells or modules, solar thermal devices, solar energy collectors, or components thereof. Disclosed assemblies and methods provide easier quality control capabilities. More particularly, rotating a single clamping nut secures an electricity generating device such as a photovoltaic ("PV") module to a rounded, square, hexagonal, octagonal, etc. torsion beam. These and additional advantages are explained in more detail below.

Figure 1:
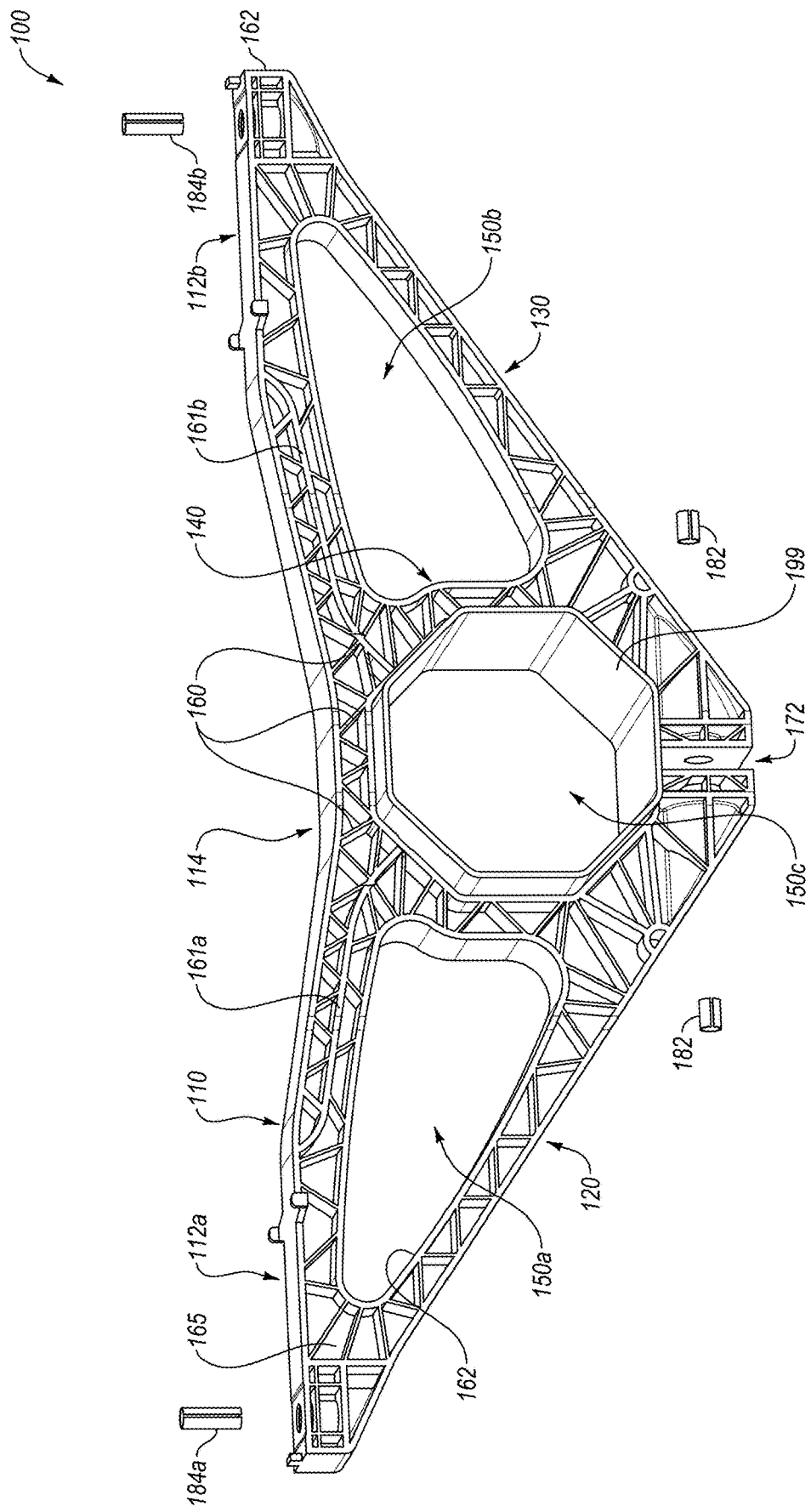
FIG. 1 is a front perspective view of an example embodiment of a mounting bracket assembly in accordance with the present disclosure.

FIG. 1 illustrates an example mounting bracket assembly 100, in accordance with one or more embodiments of the present disclosure. The mounting bracket assembly 100 may include a top region 110, a first side portion 120, a second side portion 130, and a central portion 140. The top region 110, the first side portion 120, the second side portion 130, and/or the central portion 140 may create one or more holes 150 in the mounting bracket assembly 100. The mounting bracket assembly 100 may be reinforced by one or more ribs 160, and an internal web 165 may extend between the ribs 160 and an outer lining 162 of the mounting bracket assembly 100. The central portion 140 may circumscribe a hole 150c through which a torsion beam 199 may be disposed.

The mounting bracket assembly 100 may be made of a light-weight material, such as plastic. The mounting bracket assembly 100 may be flexible such that the overall shape of the mounting bracket assembly 100 may be changed or deformed, such as by decreasing the size of the hole 150c thereby tightening the mounting bracket assembly 100 to the torsion beam 199. As used herein, the description of a light-weight material and the description of flexibility may be by comparison to other bracket assemblies, such as those made of more rigid and heavy metal materials. For example, using metal (e.g., extruded, roll-formed, and/or stamped metal) may require a continuous cross section or thickness of material. Such design results in accommodating high-stress areas, causing lower-stress areas to be over-designed. This may result in increased weight and material. Additionally or alternatively, a metal mounting bracket assembly constructed and/or manufactured using an alternative metal processing technique may be available based on the design and elements of the present disclosure, such as a die-cast metal.

The mounting bracket assembly 100 may be used to mount a PV module (not shown) to the torsion beam 199. For example, the mounting bracket assembly 100 may be slid onto the torsion beam 199 and along the length of the torsion beam 199 to the desired location corresponding to the PV module. The PV module may be bolted or otherwise fixed to the mounting bracket assembly 100, for example, using a PV bolt or clamp through holes at either end of the top region 110. The mounting bracket assembly 100 may be attached to the torsion beam 199, for example, using a bottom bolt or clamp through holes at the intersection of the first and second side portions 120/130.

The top region 110 of the mounting bracket assembly 100 may be shaped to interface with a bottom surface of a PV module (not illustrated) when the PV module is mounted to the torsion beam 199. For example, the top region 110 may include one or more flat portions 112 (such as the flat portions 112a and 112b) at either end of the top region 110. The top region 110 may include a lower portion 114 between the two flat portions 112 of the top region 110. In some embodiments, the lower portion 114 may be sized to accommodate a cord and/or plug associated with the PV module between the mounting bracket assembly 100 and the PV module such that electricity may be passed from the PV module down the line to a collection or transmission device, such as a battery or inverter, using the cord and/or plug. As the PV module is bolted to the top region 110, the mounting bracket assembly 100 may deform because the mounting bracket assembly 100 is made of a flexible material. Such deformation may reduce the depth of the lower portion 114.

Figure 2:
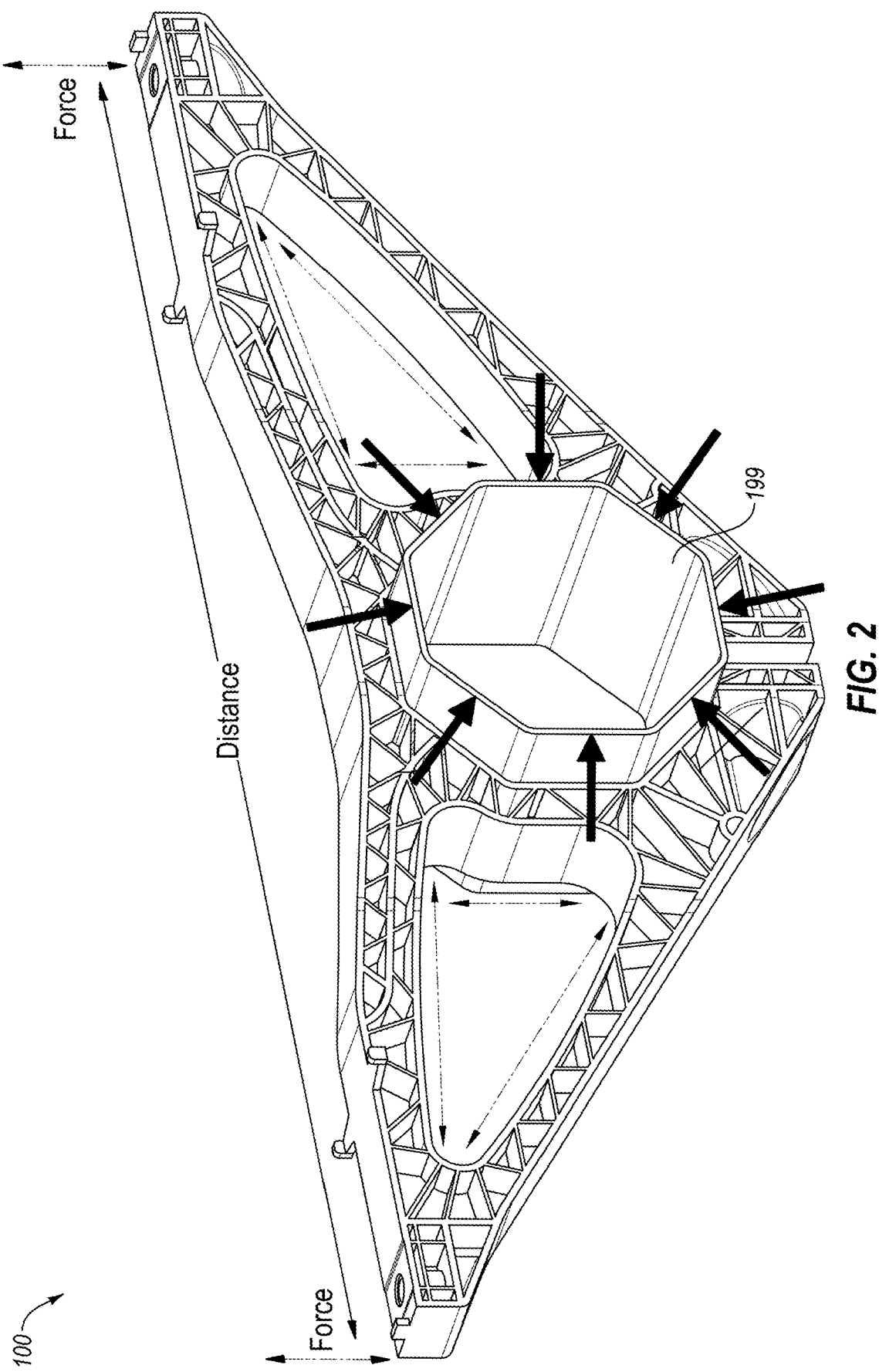
FIG. 2 illustrates a force distribution in one embodiment according to the present disclosure.
Figure 3:
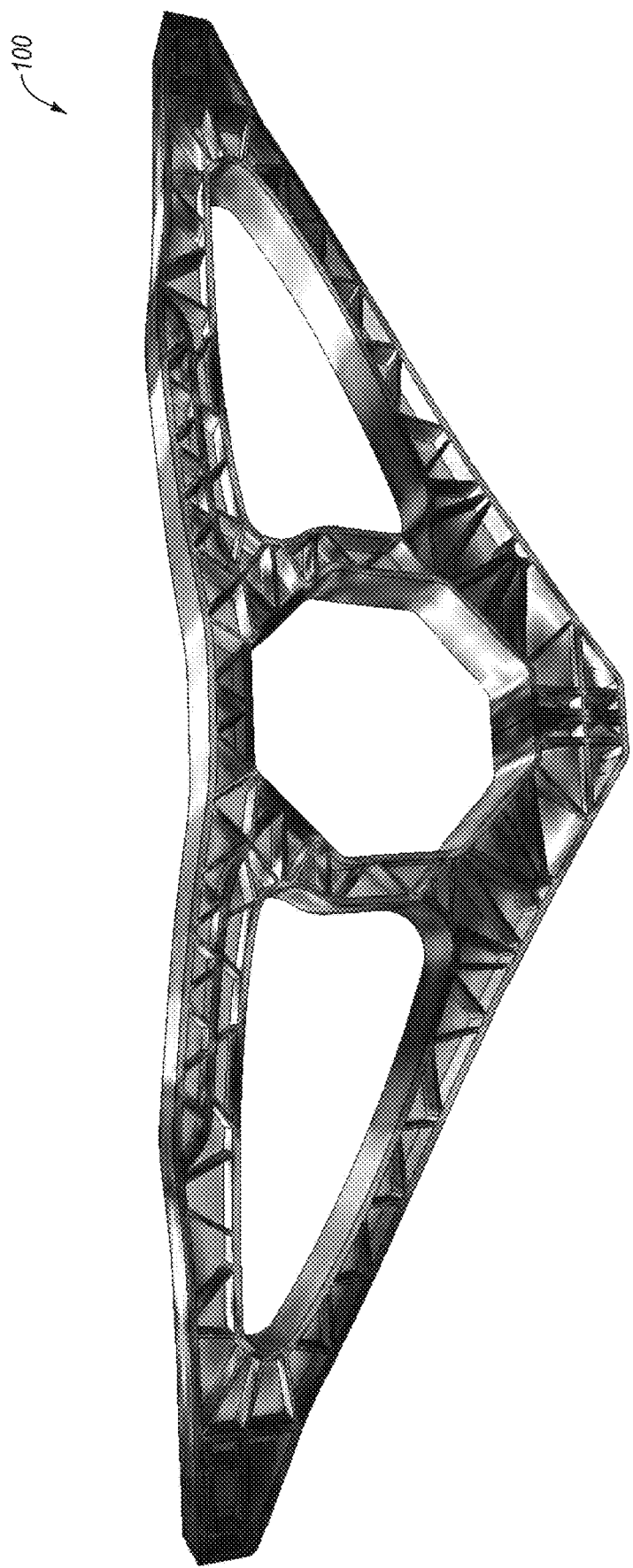
FIG. 3 is a front perspective view of the mounting bracket assembly of FIG. 1 with forces applied to the mounting bracket assembly and color representing different stresses.

The first and second side portions 120/130 of the mounting bracket assembly 100 may extend from the ends of the top region down below the torsion beam 199. The first and second side portions 120/130 of the mounting bracket assembly 100 may form a part of the surrounding of the holes 150a and 150b, respectively. The holes 150a/150b may be generally rounded triangular in shape. By providing the holes 150a/150b, less material is used, thereby potentially reducing the overall cost of producing the mounting bracket assembly 100. Additionally or alternatively, the holes 150a/150b may facilitate distribution of forces from the PV module to the torsion beam 199. For example, the first and second side portions 120/130 of the mounting bracket assembly 100 may help to distribute forces from the PV module to the lower regions of the torsion beam 199. FIGS. 2A-3 provide views of the force distribution.

In some embodiments, a set of metal sleeves 182 may be disposed at or near a gap 172 between the first and second side portions 120/130. A bottom bolt, screw, etc. (not shown) may pass through the metal sleeves 182 such that certain forces from tightening the bottom bolt and leaving the tightened bolt in place may act on the metal sleeves 182 rather than acting on the mounting bracket assembly 100. For example, to attach the mounting bracket assembly 100 to the torsion beam, a bottom bolt through the holes at the ends of the first and second side portions 120/130 proximate each other may close or reduce the gap 172 to fixedly couple the mounting bracket assembly 100 to the torsion beam. Tightening the bottom bolt may tighten the central portion 140 around the torsion beam 199. For example, prior to tightening the bottom bolt, the mounting bracket assembly 100 may be positioned along the length of the torsion beam 199 and may be readily moved along the length of the torsion beam 199 due to a space between the central portion 140 and the torsion beam 199. After the mounting bracket assembly 100 is in position, the bottom bolt may be tightened to lock the mounting bracket assembly 100 into place and around the torsion beam 199. The metal sleeves 182 may increase the longevity of the mounting bracket assembly 100 by preventing material creep or fatigue of the mounting bracket assembly 100 when tightening the bottom bolt, or over time as the bottom bolt holds the mounting bracket assembly 100 in a constricted state around the torsion beam 199 (e.g., under continuous load). The set of metal sleeves 182 may be embedded within the mounting bracket assembly 100 when injection molding the mounting bracket assembly 100.

In some embodiments, one or more metal sleeves 184 (such as the metal sleeves 184a and 184b) may be disposed at or near the ends of the top region 110. A PV bolt, screw, clamp, etc. (not shown) may pass through the metal sleeves 184 such that certain forces from tightening the PV bolt or maintaining the PV bolt in place may act on the metal sleeves 184 rather than acting on the mounting bracket assembly 100. For example, to attach the PV module to the mounting bracket assembly 100, the PV bolt and/or a clamp may be tightened to fixedly couple the PV module to the mounting bracket assembly 100. The metal sleeves 184 may increase the longevity of the mounting bracket assembly 100 by preventing material fatigue of the mounting bracket assembly 100 when coupling the PV module to the mounting bracket assembly 100. The metal sleeves 184 may be embedded within the mounting bracket assembly 100 when injection molding the mounting bracket assembly 100. For example, the metal sleeves 184 may be placed within the mold prior to injecting the plastic into the mold such that the metal sleeves 184 are formed into the mounting bracket assembly 100.

In some embodiments, the metal sleeves 182 and/or 184 may absorb bolt tension rather than the flexible body of the mounting bracket assembly 100 absorbing the bolt tension. By absorbing the bolt tension, creep in areas of the mounting bracket assembly 100 that have the bolted connections may be avoided and/or mitigated.

The central portion 140 may be shaped as a ring around the torsion beam 199 and shaped to accommodate the profile of the torsion beam 199 (e.g., circular, octagonal, hexagonal, decagonal, etc.). The central portion 140 may extend from the top region 110 to the intersection of the first and second side portions 120/130. The central portion 140 may overlap and/or form a portion of the top region 110 and/or the first and second side portions 120/130. The central portion 140 may provide a space around at least portions of the torsion beam 199 when the gap 172 is open. This may facilitate moving the mounting bracket assembly 100 along a length of the torsion beam 199. As the bottom bolt is tightened to close or reduce the size of the gap 172, the central portion 140 may constrict around the torsion beam 199 to bind the mounting bracket assembly 100 to the torsion beam 199.

In some embodiments, any and/or all of the top region 110, first and second side portions 120/130, and/or the central portion 140 may be reinforced with the ribs 160. For example, the mounting bracket assembly 100 may include a thick outer lining 162 along an outer edge of the mounting bracket assembly 100, including around the holes 150. The ribs 160 may extend between portions of the outer linings 162, such as between the outer lining 162 of the holes 150 and the outer lining 162 of the outside edge of the mounting bracket assembly 100. In some embodiments, the ribs 160 may form generally triangular shapes with portions of the outer lining 162. Such shapes may help with force distribution and/or structural integrity. In some embodiments, the ribs 160 may be of a comparable dimension as the outer lining 162 (such as projecting along a length of the torsion beam 199 the same length as the outer lining 162, e.g., the width of the mounting bracket assembly 100). In some embodiments, the ribs 160 may be of different dimension than the outer lining 162. For example, the wall thickness of the outer lining 162 may be thicker than the wall thickness of the ribs 160 and/or certain ribs 160 may have a thicker wall-thickness than the outer lining 162. In some embodiments, the wall-thickness of the outer lining 162 may be between one half and ten millimeters and the wall-thickness of the ribs 160 may be between one half and three millimeters. As will be appreciated, these ranges are simply illustrative of examples and are in no-way limiting.

In some embodiments, the ribs 160 may be located within the mounting bracket assembly 100 to follow force flow from the PV module to the torsion beam 199. In these and other embodiments, the ribs 160 may include a sweeping rib 161 (such as the ribs 161a and 161b) which may sweep from the outer lining 162 of the top region 110 proximate a border between the flat portion 112 and the lower portion 114 to the outer lining 162 of the hole 150c. In some embodiments, the sweeping rib 161 may terminate along a face of the torsion beam 199 rather than at a corner of the torsion beam 199. In some embodiments, the sweeping rib 161 may be of comparable or similar wall-thickness as the outer lining 162 and the remainder of the ribs 160 may be of a smaller wall-thickness than the outer lining 162.

In some embodiments, the mounting bracket assembly 100 may include the internal web 165 spanning between and among the outer lining 162 and the ribs 160. For example, the internal web 165 may cover the entire or nearly the entire region between the outer lining 162 of the outer edge of the mounting bracket assembly 100 and the outer lining 162 of the holes 150. In some embodiments, there may be voids or variations in the internal web 165 for certain components. For example, the internal web 165 may be curved to accommodate the metal sleeves 182 and the bottom bolt. The internal web 165 may carry at least a portion of the shear stress experienced by the mounting bracket assembly 100 and may reduce deflection of the mounting bracket assembly 100. Additionally, the internal web 165 may facilitate a more streamlined production process as the mold for injection molding may have a more ready path for the plastic material to fill the mold than would be the case without the internal web 165.

In some embodiments, the injection molded plastic material may include one or more additives to the material. The plastic may include any polymer of sufficient strength to support the PV module. For example, the plastic may include acrylonitrile butadiene styrene (ABS), Poly(methyl methacrylate) (acrylic or PMMA), epoxy, Polyamide (Nylon or PA), polyethylene (PE), polypropylene (PP), etc. In some embodiments, the injection molded plastic may include a reinforcing agent, such as glass, fiberglass, carbon fiber, glass beads, etc. In some embodiments, the reinforcing agent may include a range that may start or end at any of 5%, 10%, 15%, 20%, 25%, 30%, 35%, 40%, 45%, 50%, 55%, 60%, 65%, and 70% by weight. For example, the reinforcing agent may be between 10% and 60% reinforcing agent, between 15% and 50% reinforcing agent, or between 25% and 45% reinforcing agent. In some embodiments, the reinforcing agent may include 25% of the material by weight.

In some embodiments, the injection molded plastic may include one or more UV resistant fillers, absorbers, or additives. For example, carbon black may be included as the reinforcing agent and also act as the UV absorber/resistant filler. As another example, carbon black may be included as the UV absorber and glass or fibers may be used as the reinforcing agent. Other examples of UV resistant additives may include rutile titanium oxide, hydroxybenzophenone, hydroxyphenylbenzotriazole, hydroxyphenylbenzotriazole, oxanilides, benzophenones, benzotriazoles, nickel, Hindered Amine Light Stabilizers (HALS) (such as those with a 2,2,6,6-tetramethylpiperidine ring structure), or any combinations thereof. For example, carbon black and a HALS may be combined as the UV resistant filler.

Modifications, additions, or omissions may be made to FIG. 1 of the present disclosure. For example, changes as described herein may be made in accordance with the knowledge of a person of ordinary skill in the art. For example, the mounting bracket assembly 100 may take different forms, with different numbers and orientations of ribs, etc. As another example, the size of the mounting bracket assembly 100 may be extended such that the top region 110 is longer to accommodate different sizes of PV modules, and may include a corresponding change in length/angle of the first and second side portions 120/130.

FIG. 2 illustrates a force distribution in one embodiment according to the present disclosure compared to a traditional mounting bracket. FIG. 2 illustrates a mounting bracket assembly 100 consistent with at least one embodiment of the present disclosure.

As illustrated in FIG. 2, as wind, snow, or other factors exert forces on a PV module attached via the mounting bracket assembly 100 to the torsion beam 199, the associated forces are distributed circumferentially around the torsion beam 199 (as illustrated by the red/black arrows). For example, the sweeping ribs 161, the first side portion 120, and/or the second side portion 130, may facilitate the distribution of the forces (as illustrated by the blue/gray arrows) throughout the mounting bracket assembly 100 such that the forces are applied to the torsion beam 199 at multiple locations around the torsion beam 199.

In contrast, as wind, snow, or other factors exert forces on a PV module attached via a typical mounting bracket, the majority of forces are applied directly to a top surface of the torsion beam. Such an arrangement may create failure points and increased material strain in the mounting bracket, the torsion beam, and/or the PV module at the location corresponding to where the forces are applied. Additionally or alternatively, the arrangement may result in the use of excess material throughout the remainder of the typical mounting bracket to provide sufficient material at the location corresponding to where the forces are applied, resulting an in an expensive component.

FIG. 3 is a front perspective view of the mounting bracket assembly 100 of FIG. 1 with forces applied to the mounting bracket assembly and color representing different stresses experienced by the mounting bracket assembly 100. The lighter colors (e.g., green, yellow)/lighter gray tones indicate greater stress while the darker colors (e.g., blue)/darker gray tones indicate less stress on the mounting bracket assembly 100.

As illustrated in FIG. 3, there are high stress points in the holes 150b/c near where the first and second side portions 120/130 branch away from the top region 110. There are also high stress regions in the lower portion 114. There are additional high stress points near the vertices of the torsion beam 199. There are low stress points near the gap 172, along the flat portions 112, and along the sweeping ribs 161.

FIG. 4A is a front view of the mounting bracket assembly of FIG. 1, and FIG. 4B is a cut away view of the mounting bracket assembly of FIG. 1. FIG. 4A includes a solid red (or black) line with arrows indicating the direction of the cut-away view of FIG. 4B.

As illustrated in FIG. 4B, the mounting bracket assembly 100 includes the internal web 165. FIG. 4B also illustrates a comparison of various wall-thicknesses for different ribs 160 and outer linings 162. For example, the outer lining 162 may be a first wall-thickness that may be similar or comparable to the internal web 165. Some ribs 160, such as the rib 160a, may be of a second wall-thickness that is more than the first wall-thickness, and some ribs 160, such as the rib 160b, may be of a third wall-thickness that is less than the first wall-thickness.

Figure 5:
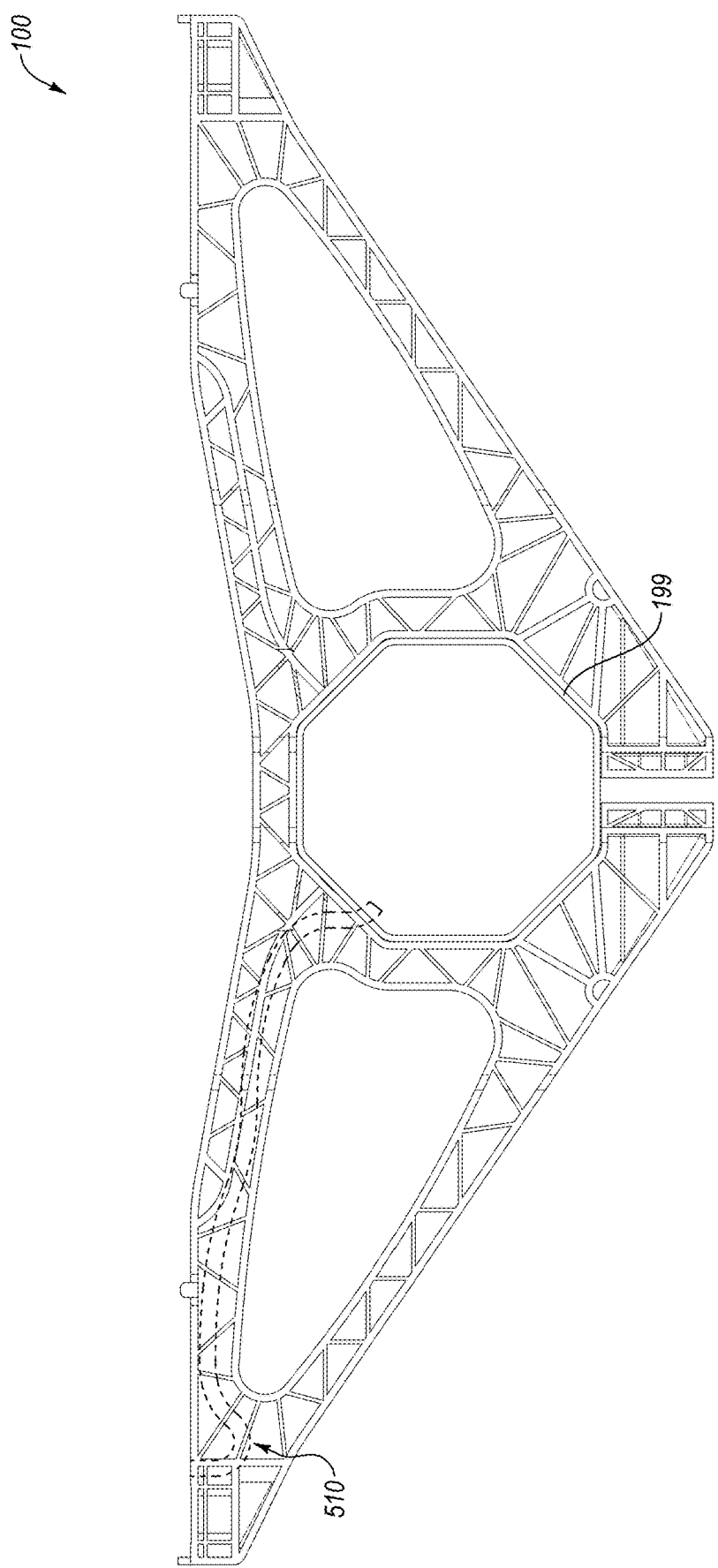
FIG. 5 is a front view of the mounting bracket assembly of FIG. 1 with a conductive component.
Figure 7B:
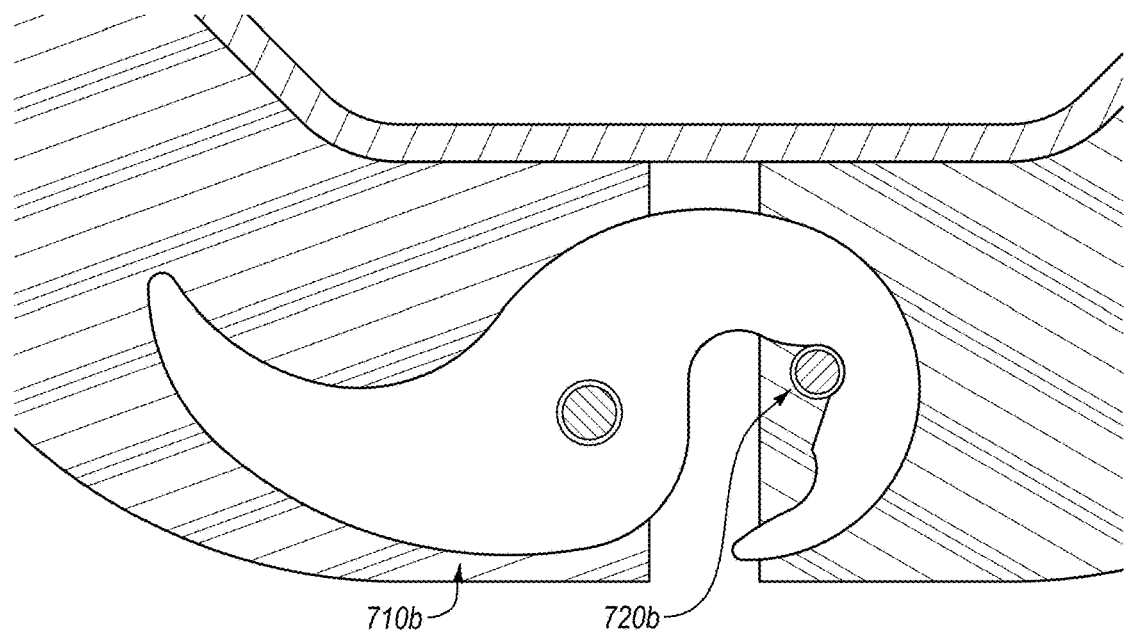
Figure 7C:
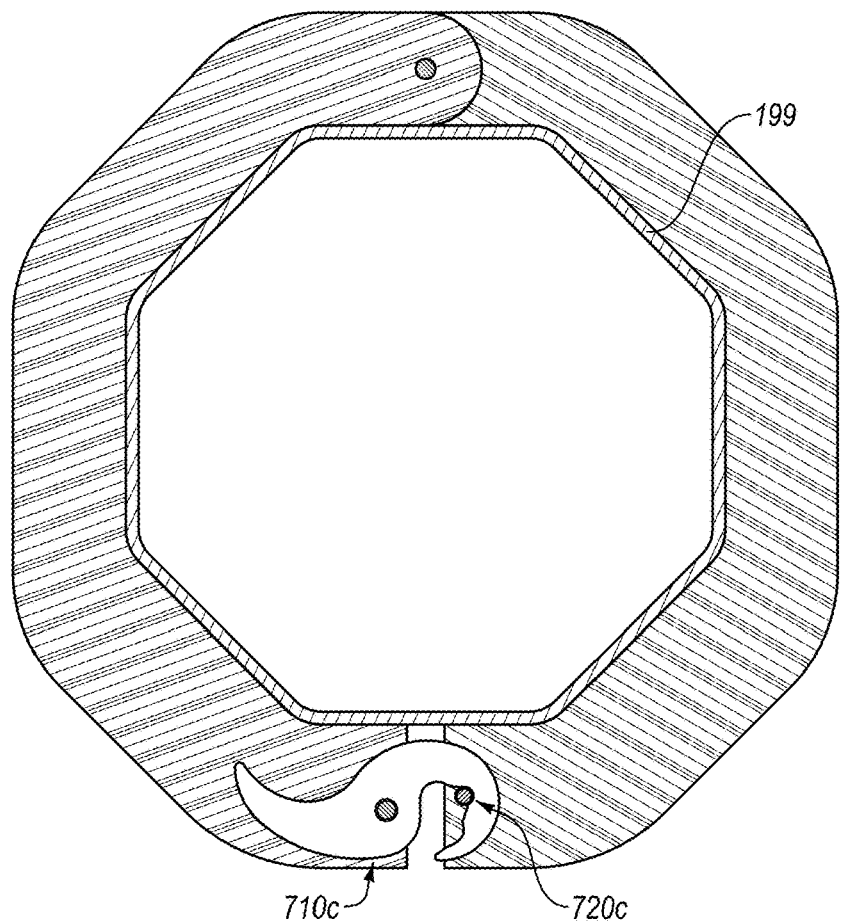
Figure 7D:
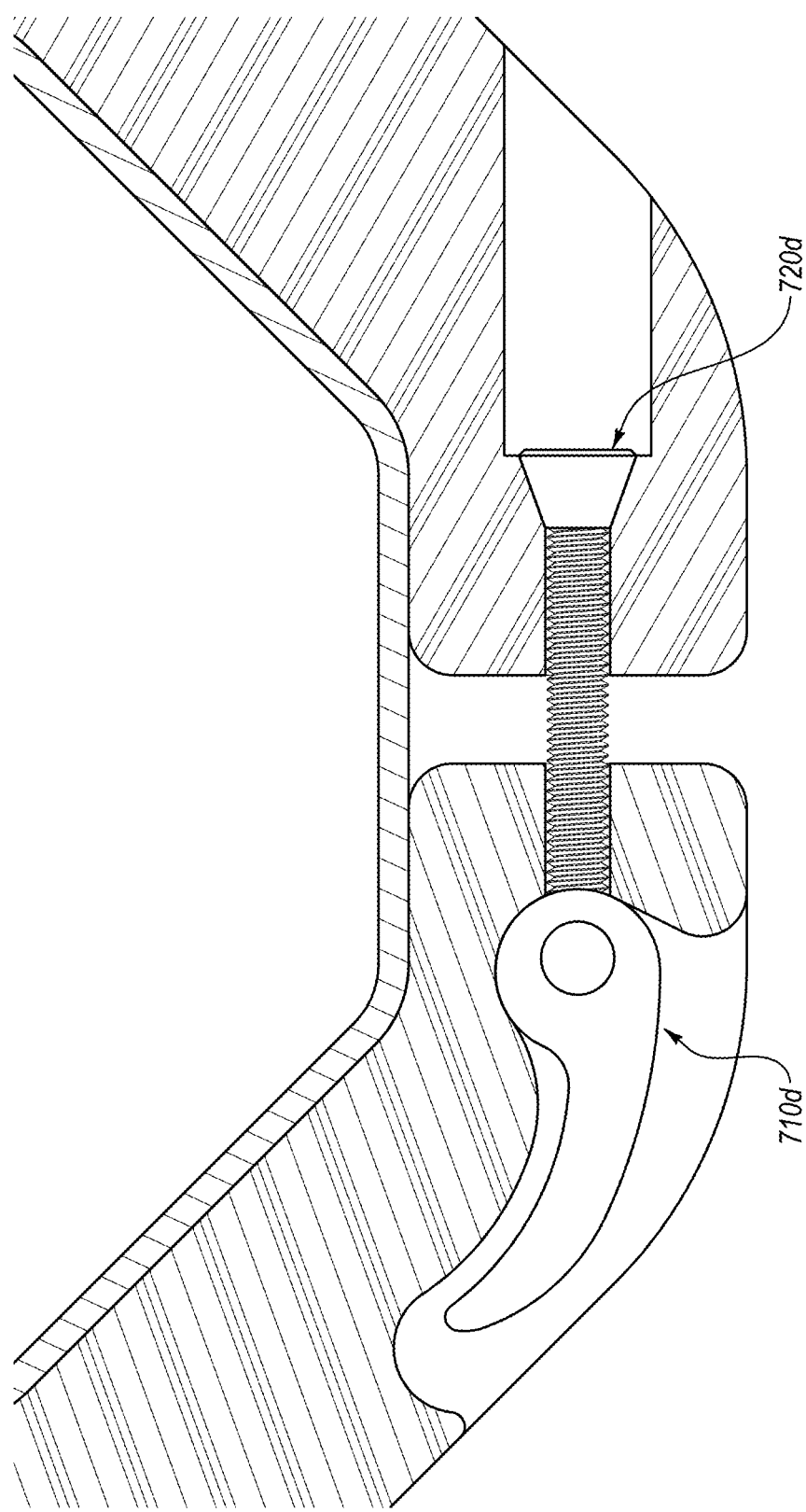

FIG. 5 is a front view of the mounting bracket assembly 100 of FIG. 1 with a conductive component 510. One component of mounting brackets is that they often provide electrical grounding for the PV module to the torsion beam 199. When a conventional metal mounting bracket is used, because the mounting bracket itself is metal, it can provide the grounding between the torsion beam and the PV module. However, if made of a plastic material, the mounting bracket assembly 100 may include the conductive component 510.

The conductive component 510 may be a ribbon, wire, or other component made of an electrically conductive material and disposed such that at least a first portion of the conductive component 510 is exposed within the hole 150c, and a second portion of the conductive component 510 is exposed in a portion of the top region 110 that interfaces with the PV module, such as the flat portions 112. By including the first and second exposed portions, an electrical connection may be made between the torsion beam 199 and the PV module such that the PV module may be grounded to the torsion beam 199.

In some embodiments, the conductive component 510 may be replaced by an external clip or other feature for providing the grounded connection between the PV module and/or connecting hardware and the torsion beam 199. For example, the clip may have a metal component that interfaces with the frame of the PV module along the flat portion 112 on the top of the mounting bracket assembly 100. There may additionally be a conductive connection between the clip and any bolt coupling the PV module to the mounting bracket assembly 100 (such as one or more of the bolts passing through the optional metal sleeves 184). Additionally or alternatively, there may be a further conductive connection between the bolt coupling the PV module to the mounting bracket assembly and the bolt fixing the mounting bracket assembly 100 to the torsion beam 199, and/or the torsion beam 199. For example, the external clip may have a wire that is routed to interface with a bolt passing through the metal sleeves 184a and 184b, and then routed down to interface with a bolt passing through the metal sleeves 182. A metal tab or extension of the wire may proceed from the bolt passing through the metal sleeves 182 to interface with the torsion beam 199. Additionally or alternatively, any other approach may be utilized to provide grounded electrical communication between the PV module and/or any connecting hardware and the torsion beam 199.

In some embodiments, the conductive component 510 may be disposed within an injection molding mold prior to injecting the plastic into the mold. When the plastic is injected into the mold, the conductive component 510 may be formed with and become a part of the mounting bracket assembly 100. In some embodiments, the location for the exposed portions and/or the path of the conductive component 510 may be selected to be in locations of the mounting bracket assembly 100 of low stress points, such as at faces of the torsion beam 199 rather than at corners of the torsion beam 199, and at the flat portions 112.

FIG. 6 illustrates another example embodiment of a mounting bracket assembly 600 in accordance with the present disclosure. The mounting bracket assembly 600 may be similar or comparable to the mounting bracket assembly 100 of FIG. 1. However, rather than including a single unitary body, the mounting bracket assembly 600 may include one or more modular components, such as a first modular component 620 and a second modular component 630 that may be coupled to a central component 610 when installing or preparing to install a PV module. In some embodiments, the mounting bracket assembly 600 may be made of a flexible material similar or comparable to that of the mounting bracket assembly 100 of FIG. 1. Due to the low cost and flexibility in manufacturing when using such a material, the mounting bracket assembly 600 may be a modular design in which a central component 610 may surround the torsion beam 199 and modular components 620/630 may be fixedly coupled to the central component 610 to create the full mounting bracket assembly 600 during or prior to installation. This may permit customized shapes, dimensions, etc. of the mounting bracket assembly 600.

The central component 610 may be shaped and configured to surround a torsion beam 199 in a similar or comparable manner as the central portion 140 of the mounting bracket assembly 100 of FIG. 1. For example, the central component 610 may include a gap 672 that may facilitate space between the central component 610 and the torsion beam 199 when positioning the mounting bracket assembly 600 along the torsion beam 199 during installation. After positioning the central component 610 at the desired location along the torsion beam 199, a bottom bolt may be tightened to close or reduce the gap 672 in a similar or comparable manner to the closing of the gap 172.

The modular components 620/630 may include a length of material that operates in a similar or comparable manner to a combination of the flat portions 112 of the top region 110 and the side portions 120/130 of the mounting bracket assembly 100 of FIG. 1. For example, the modular components 620/630 may include a top surface against which a PV module is mounted and reinforcing structure to support the forces and stresses experienced by the mounting bracket assembly 600 when fixedly coupling the PV module to the torsion beam 199.

In some embodiments, any of the central component 610 and/or modular components 620/630 may include reinforcing or strengthening features, such as ribs, internal webs, outer linings, metal sleeves, etc.

When installing or preparing to install the mounting bracket assembly 600, the modular components 620/630 may be combined with the central component 610. For example, the first modular component 620 may be fixedly coupled to the central component 610 at an interface 640a and the second modular component 630 may be fixedly coupled to the central component 610 at an interface 640b. The interfaces 640a/640b may include any locking interface between components, such as mechanical fastening (e.g., by bolts, screws, interlocking teeth, etc.), chemical fastening (e.g., chemically bonding the two components, an adhesive, etc.), heat fastening (e.g., melting the two components together), etc.

By using the modular components 620/630, a customized mounting bracket assembly 600 may be used with specific lengths that are tailored to the specific region or location in which the mounting bracket assembly 600 is installed. For example, if installing a PV module using the mounting bracket assembly 600 at a base of a canyon, high winds may be known to come out of the canyon, but wind forces in all other directions may be relatively normal. To deal with the increased stress of the wind from the one direction, one of the modular components 620/630 may be longer than the other. For example, as illustrated in FIG. 6, the first modular component 620 has a length of x that is shorter than a length y of the second modular component 630. As another example, the PV modules at the periphery of a solar field may be installed with longer modular components 620/630 as the PV modules at the periphery of the solar field may experience higher winds without shielding experienced by the remainder of the solar field. As a further example, PV modules of different dimensions, weights, etc. may be readily accommodated by selecting modular components of different lengths when installing the mounting bracket assembly 600.

Modifications, additions, or omissions may be made to FIG. 6 of the present disclosure. For example, changes as described herein may be made in accordance with the knowledge of a person of ordinary skill in the art. For example, the mounting bracket assembly 600 may take different forms, with any number and orientation of ribs, etc.

FIGS. 7A-7E illustrate various views of potential connecting mechanisms associated with a mounting bracket assembly in accordance with the present disclosure. For example, the devices of FIGS. 7A-7E illustrate various tool-less locking mechanisms that may be used to replace certain bolts or other features for locking certain connections into place when affixing a mounting bracket assembly to a torsion beam and/or affixing a PV module to a mounting bracket assembly. The various connections may include a cam 710 (such as the cams 710a, 710b, 710c, and/or 710d) and a post 720 (such as the posts 720a, 720b, 720c, and/or 720d). As the cam 710 rotates around the post 720, the thickness of the cam 710 increases, drawing a surface to which the post 720 is attached closer to the cam 710 or forcing a surface through which the post 720 projects further away from the cam 710, and/or variations thereof.

In some embodiments, the cams 710 may include a locking feature such that after rotating the cam 710 a certain amount, the surface of the cam 710 includes a protrusion past which the post 720 must pass to rotate back and which may lock the cam 710 into place. For example, cams 710a and 710b illustrate such a locking feature.

The various tool-less locking mechanisms may be used in any of a variety of locations and purposes consistent with the present disclosure and/or consistent with any mounting bracket. For example, the tool-less locking mechanisms may be used to lock the central portion 140 of FIG. 1 to the torsion beam 199, closing or reducing the gap 172. As another example, the tool-less locking mechanisms may be used at the location of the optional metal sleeves 184 to couple the PV module to the mounting bracket assembly 100 of FIG. 1. As a further example, for mounting bracket assemblies that use a single bolt both to clamp the PV module to the mounting bracket assembly and to bind the mounting bracket assembly to the torsion beam (such as those described in U.S. Patent Publication No. 2017/

0359017; 2018/0254740; and 2018/0348331; and U.S. Pat. Nos. 8,459,249; 9,281,778; 9,581,678; 9,631,840; 10,042,030; and 10,069,455; each of which is incorporated by reference herein in its entirety), a cam 710 and post 720 (such as 710d/720d) may be used. As an additional example, the tool-less locking mechanism may be used to tension a cable where the cable may be used to couple the PV module to the mounting bracket assembly, couple the mounting bracket assembly to the torsion beam, etc.

In these and other embodiments, the amount of force required to rotate the cam 710 around the post 720 to clamp the feature in place may be specifically designed based on the use to which the tool-less locking mechanism is used. For example, certain bolts may have a set torque to which they are to be tightened during installation. The tool-less locking mechanism may be designed to have a corresponding design such that the same or a comparable amount of force is applied when rotating the cam 710 around the post 720.

The embodiment illustrated in FIG. 7A may include two components of the central portion and/or the enclosure about the torsion beam that slide past each other, permitting a clasp from one side to fold down over the other to be engaged with the corresponding feature on the other component. For example, the cam 710a may rotate about the post 720a on a component that slides past the component upon which the cam 710a is mounted.

As illustrated in FIG. 7E, a clip 715e and bolt 725e may be used to facilitate securing the feature in place. For example, an enclosure around the torsion beam 199 may include a female portion for receiving the clip 715e into which the clip 715e may snap using manual and/or tool-less force to snap the clip 715e into place. After snapping the clip 715e into place, the feature may be positioned to a desired location and the bolt 720e may be tightened to draw the two sides of the enclosure even closer together, thus more securely attaching the enclosure to the torsion beam 199.

Modifications, additions, or omissions may be made to FIGS. 7A-7E without departing from the scope of the present disclosure. For example, changes as described herein may be made in accordance with the knowledge of a person of ordinary skill in the art. For example, any style or type of cam locking mechanism or other tool-less locking feature may be used.

Figure 8A:
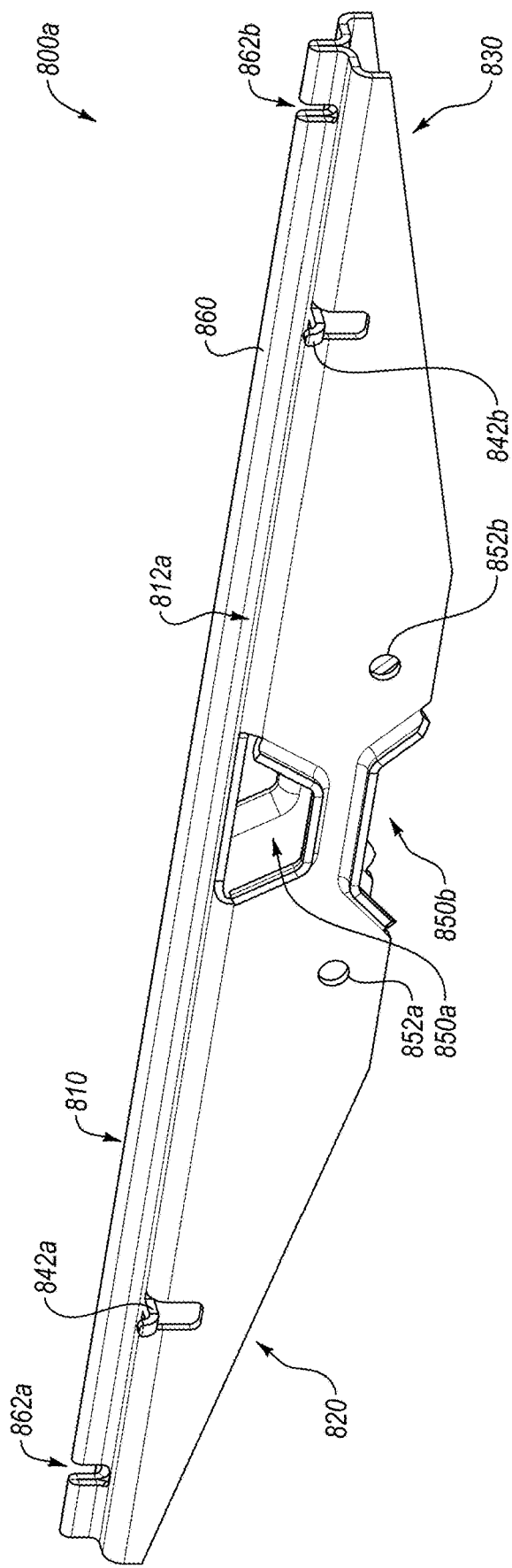
FIGS. 8A-8C illustrate various views of a further example embodiment of a mounting bracket assembly in accordance with the present disclosure.
Figure 8C:
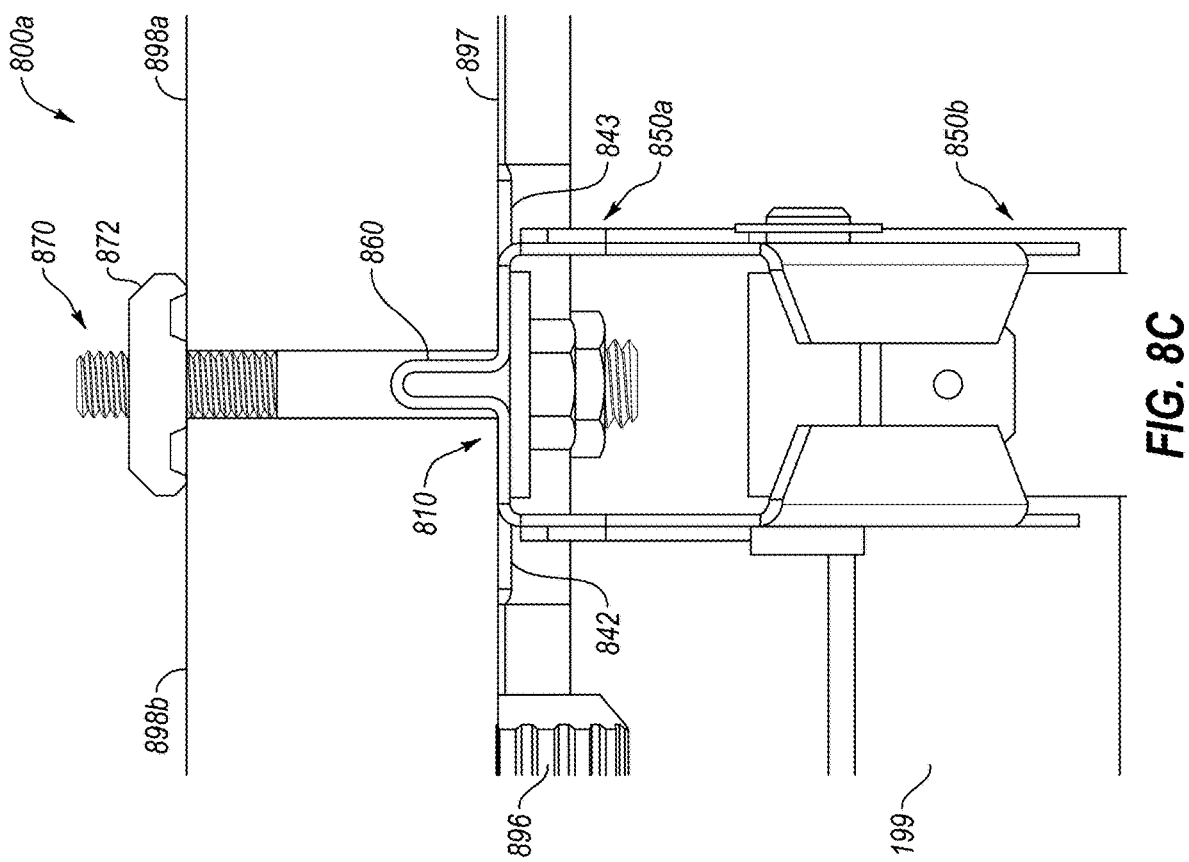
Figure 8B:
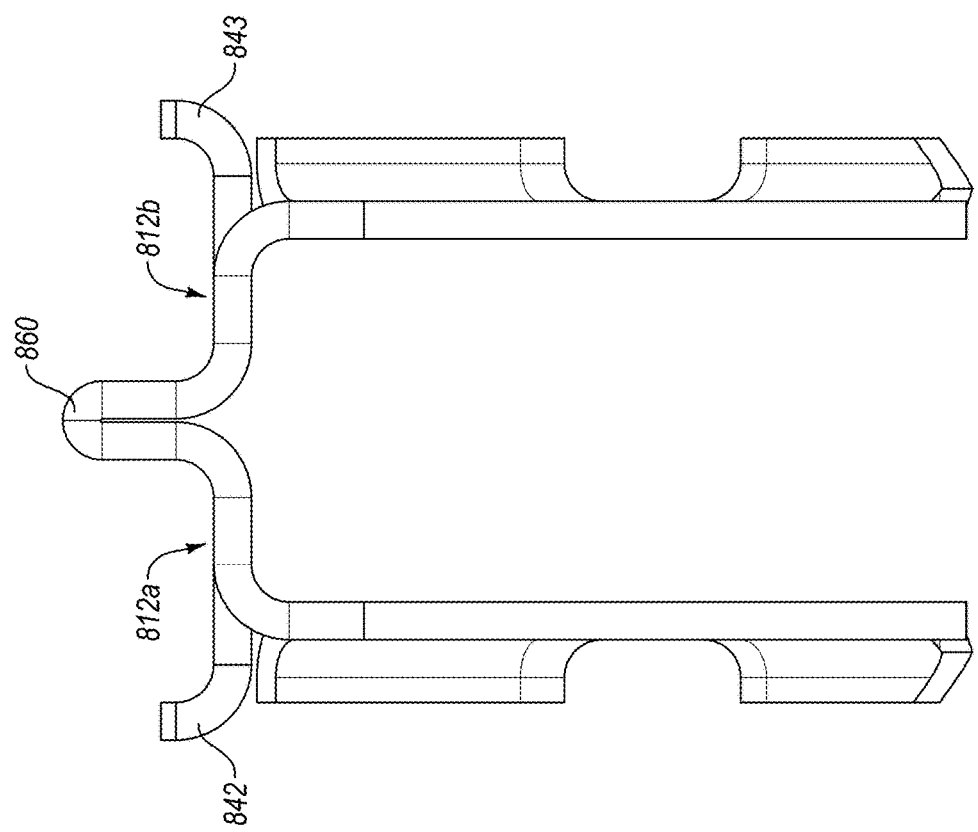

FIGS. 8A-8C illustrate various views of a further example embodiment of a mounting bracket assembly 800a in accordance with the present disclosure. FIG. 8A illustrates a perspective view of the mounting bracket assembly 800a. FIG. 8B illustrates an end view of the mounting bracket assembly 800a. FIG. 8C illustrates a similar end view to that shown in FIG. 8B but with PV modules 898a and 898b coupled to a torsion beam 199 using the mounting bracket assembly 800a. The mounting bracket assembly 800a may include a top region 810 for interfacing with PV modules and first and second side regions 820 and 830. The mounting bracket assembly 800a may include a ridge 860 along the top region 810. The ridge 860 may provide additional structural support and rigidity to the mounting bracket assembly 800a. Additionally, the ridge 860 may permit a hole 850a along the top region 810 near a gap 850b for a torsion beam (not illustrated), despite leaving a narrow neck 875 of material between the hole 850a and the gap 850b. For example, the ridge 860 may provide sufficient structural integrity and strength to the mounting bracket assembly 800a to withstand the forces due to wind, etc. of attached PV module 898 without material failure at the narrow neck 875. In contrast, in a typical mounting bracket assembly without the ridge 860 (e.g., where the hole 850a is open at the top to the PV module 898), the mounting bracket assembly may be more susceptible to material failure at the narrow neck 875 when under stress.

In some embodiments, the mounting bracket assembly 800a may be made of a solid piece of metal processed to include the shape, gaps, holes, and bends of the form illustrated in FIGS. 8A-8C. For example, a sheet of metal may be rolled, stamped, or otherwise processed into the form illustrated in FIGS. 8A-8C.

Figure 8E:
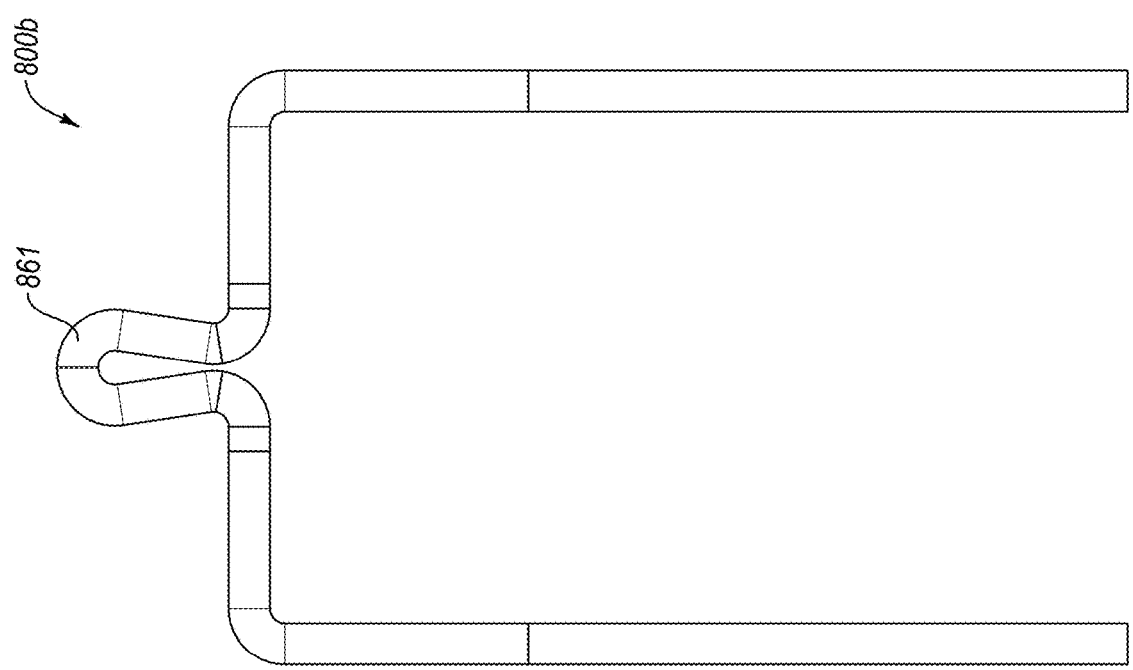

As illustrated in FIGS. 8A-8C, the ridge 860 may be shaped to protrude upward from two or more shelves 812 (such as the shelves 812a and 812b) against which the PV module 898 rests, and the ridge 860 may be disposed between two adjacent PV modules 898. The ridge 860 may be any height up to the height of the frame of the PV module, or even higher if the gap 862 is wide enough at the top to accommodate the threaded clamp component 872. The ridge 860 may have any profile. For example, while illustrated with straight sides and a curved top, the ridge 860 may include a flat top, an angled top, or any other shape. As another example, the ridge 860 may taper along all or a portion of its height and/or may come to a point. As an additional example, the ridge 860 may include one or more distinct sheets of material pressed against each other, rather than one contiguous surface. One example of another profiles is illustrated in FIGS. 8D and 8E. In these and other embodiments, the distinct sheets may or may not be coupled together using welding, an adhesive, etc.

When coupling the mounting bracket assembly 800a to the torsion beam 199, the mounting bracket assembly 800a may be positioned along the torsion beam 199 to the desired position relative to the torsion beam 199 to accommodate the PV modules 898a and 898b. The gap 850b may be shaped to match at least a portion of a profile of the torsion beam 199. Bolts, clamps, U-bolts, etc. may be used to fixedly couple the mounting bracket assembly 800a to the torsion beam 199. For example, a U-bolt may go around the torsion beam 199 and couple to the mounting bracket assembly 800a via the holes 852a and 852b while the torsion beam 199 is disposed within the gap 850b. In some embodiments, the gap 850b may include a lining or lip of material that interfaces with the torsion beam 199.

When coupling the PV modules 898 to the mounting bracket assembly 800a, module locating tabs 842/843 may be used to interface with holes in the bottom of the PV modules 898. For example, PV modules 898 may include holes in the bottom through which bolts may pass to couple the PV modules 898 to frames during installation. The module locating tabs 842/843 may be positioned along the mounting bracket assembly 800 to project into such mounting holes to hold the PV modules 898 in place relative to the mounting bracket assembly 800a as the PV modules 898 rest upon the shelves 812a and/or 812b. The module locating tabs 842a and 842b may be at a specific distance apart from each other corresponding to the PV module 898 being installed. For example, the module locating tabs 842a and 842b may be 400 mm, 600 mm apart, 800 mm apart, 1000 mm apart, etc. corresponding to spatial differences for mounting holes on different types, shapes, styles, and/or brands of PV modules. In some embodiments, the module locating tabs 842a and 842b may be stamped into the mounting bracket assembly 800a. Additionally or alternatively, the module locating tabs 842a and 842b may be an accessory that is attached to the mounting bracket assembly 800a after shaping of the core component of the mounting bracket assembly 800a, such as a plastic tab that is snapped into the core metal component.

When coupling the PV modules 898 to the mounting bracket assembly 800a, a clamp 870 may be used to press the PV modules 898a/b against the mounting bracket assembly 800a. For example, the clamp 870 may include a bolt that passes through a gap 862 (such as the gaps 862a/862b) in the ridge 860. The clamp 870 may further include a threaded clamp component 872 that presses against the top surface of the PV modules 898a and 898b simultaneously, and a washer and/or nut disposed inside of the mounting bracket assembly 800a, although any attachment mechanism may be used, such as a bolt head, the locking features illustrated in FIG. 7, etc. As illustrated in FIG. 8C, the clamp 870 pinches the PV modules 898a and 898b between the top region 810 of the mounting bracket assembly 800 and the threaded clamp component 872 with the ridge 860 protruding up between the PV modules 898a and 898b. The module locating tabs 842 and 843 project up into the PV modules 898a and 898b. In some embodiments, the clamp 870 may include tabs or spacers shaped to project down in between the two adjacent PV modules 898a and/or 898b.

With the PV modules 898a and 898b attached, a plug 896 and cord 897 may pass through the hole 850a to carry electricity generated at the PV modules 898a and/or 898b. This may permit the cord 882 to run generally parallel with the torsion beam 199 to which the mounting bracket assembly 800 is affixed.

FIGS. 8D and 8E illustrate various views of an additional example embodiment of a mounting bracket assembly 800b in accordance with the present disclosure. The mounting bracket assembly 800b may be similar or comparable to the mounting bracket assembly 800a illustrated in FIGS. 8A-8C.

The mounting bracket assembly 800b may include a gap 853 shaped to accommodate a torsion beam when coupling the mounting bracket assembly 800b to the torsion beam. Additionally or alternatively, the mounting bracket assembly 800b may include a framework 856 for coupling the mounting bracket assembly 800b to the torsion beam. For example, two posts may project through the body of the mounting bracket assembly 800b through which two arms may pivot or rotate to enclose the torsion beam. Additionally or alternatively, a bolt or other fastener (such as the tool-less fasteners illustrated in FIGS. 7A-7E) may extend between the two arms at the bottom of the gap 853 for the torsion beam.

In some embodiments, the body of the mounting bracket assembly 800b may include one or more holes 851 (such as the holes 851a and/or 851b) that may permit the pass through of wires and/or plugs past the mounting bracket assembly 800b. In some embodiments, a plastic or composite insert 854 (such as the inserts 854a and/or 854b) may be inserted into the holes 851 to prevent damage or rubbing of the wires or plugs against the body of the mounting bracket assembly 800b.

In some embodiments, mounting bracket assembly 800b may include one or more holes 841 to which an accessory or other feature may be added to the body of the mounting bracket assembly 800b. For example, PV module locating tabs may be attached to the mounting bracket assembly 800b via the holes 841.

The mounting bracket assembly 800b may include a ridge 861 that may be similar or comparable to the ridge 860 of FIGS. 8A-8C. For example, the ridge 861 may provide structural integrity and reinforcement to the mounting bracket assembly 800b. Additionally, the ridge 861 may project upward between two adjacent PV modules.

In some embodiments, the mounting bracket assembly 800b may include a grounding clip 876. The grounding clip 876 may be made of an electrically conductive material and may be shaped and positioned to contact one PV module frame, span over the ridge 861, and contact an adjacent PV module frame. By doing so, the two adjacent PV module frames may be in electrical communication and thus provide a consistent ground between the two. In some embodiments, the grounding clip may include one or more features (e.g., teeth, barbs, protrusions, blades, etc.) configured to break through an anodized surface to provide a consistent and/or solid electrical connection between the grounding clip 876 and the PV module frame.

In some embodiments, the mounting bracket assembly 800b may include a clip component 873 that may be configured to provide a downward force against the PV module frames to pinch them against the mounting bracket assembly 800b. For example, a bolt may pass through the clip component 873, the grounding clip 876, and the ridge such that as the bolt is tightened, it draws the top of the clip component 873 downwards towards the mounting bracket assembly 800b. As the clip component 873 is drawn downwards, it pinches the PV module frame.

FIG. 8E illustrates another view of the mounting bracket assembly 800b of FIG. 8D. For example, as illustrated in FIG. 8E, the ridge 861 may include a profile that extends upwards from the mounting bracket assembly 800b and starts narrowly and flares out towards a bulb shape at the top of the ridge 861.

Modifications, additions, or omissions may be made to FIGS. 8A-8E of the present disclosure. For example, changes as described herein may be made in accordance with the knowledge of a person of ordinary skill in the art. For example, the mounting bracket assembly 800 may be of various lengths with the module locating tabs 842 and 843 at different positions. In these and other variations, the gaps 862 in the ridge 860 may or may not be at different locations as the threaded clamp component 872 may interface anywhere along the top surface of the PV modules 898. As another example, the profile of the gap 850b may be any shape to accommodate the profile of the torsion beam 199.

Figure 9A:
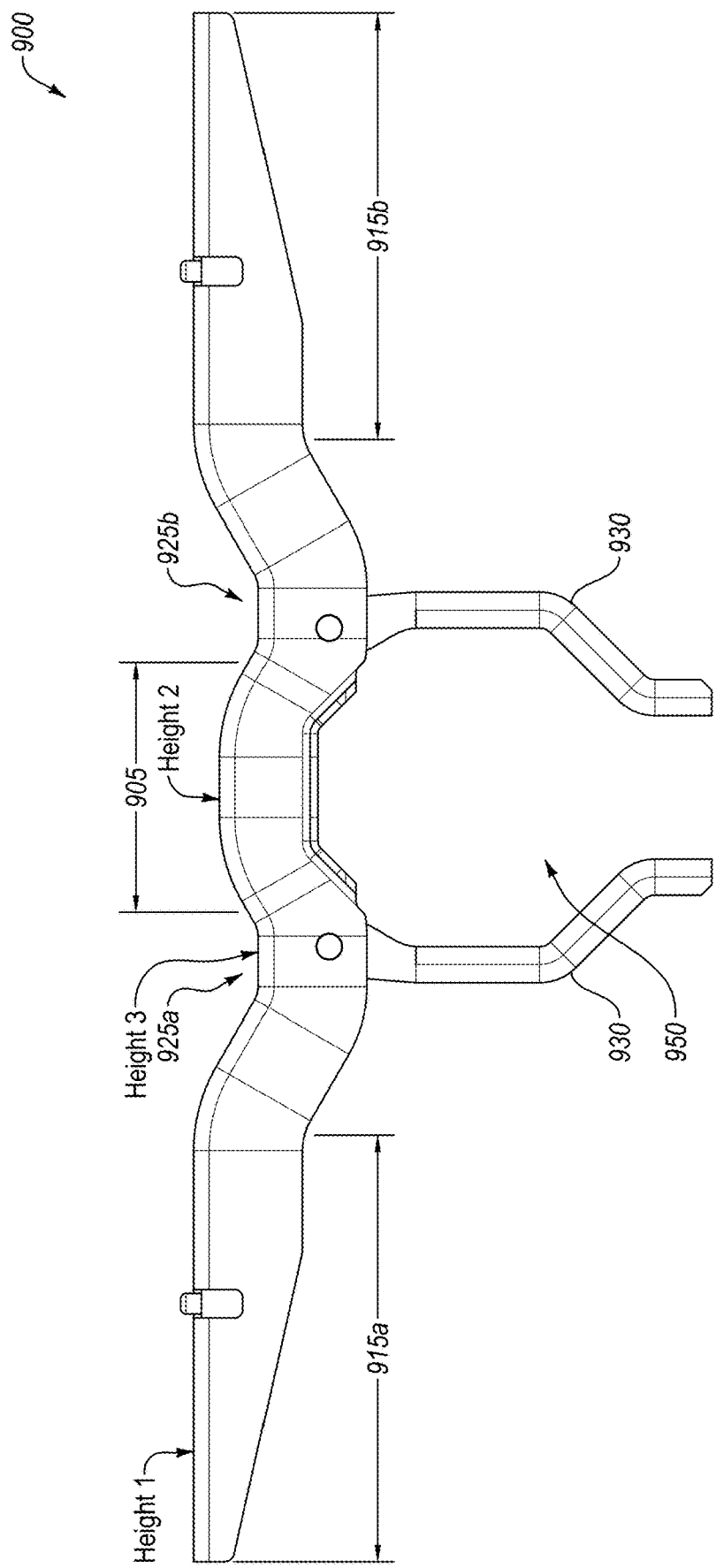
FIGS. 9A and 9B illustrate an additional example embodiment of a mounting bracket assembly in accordance with the present disclosure.
Figure 9B:
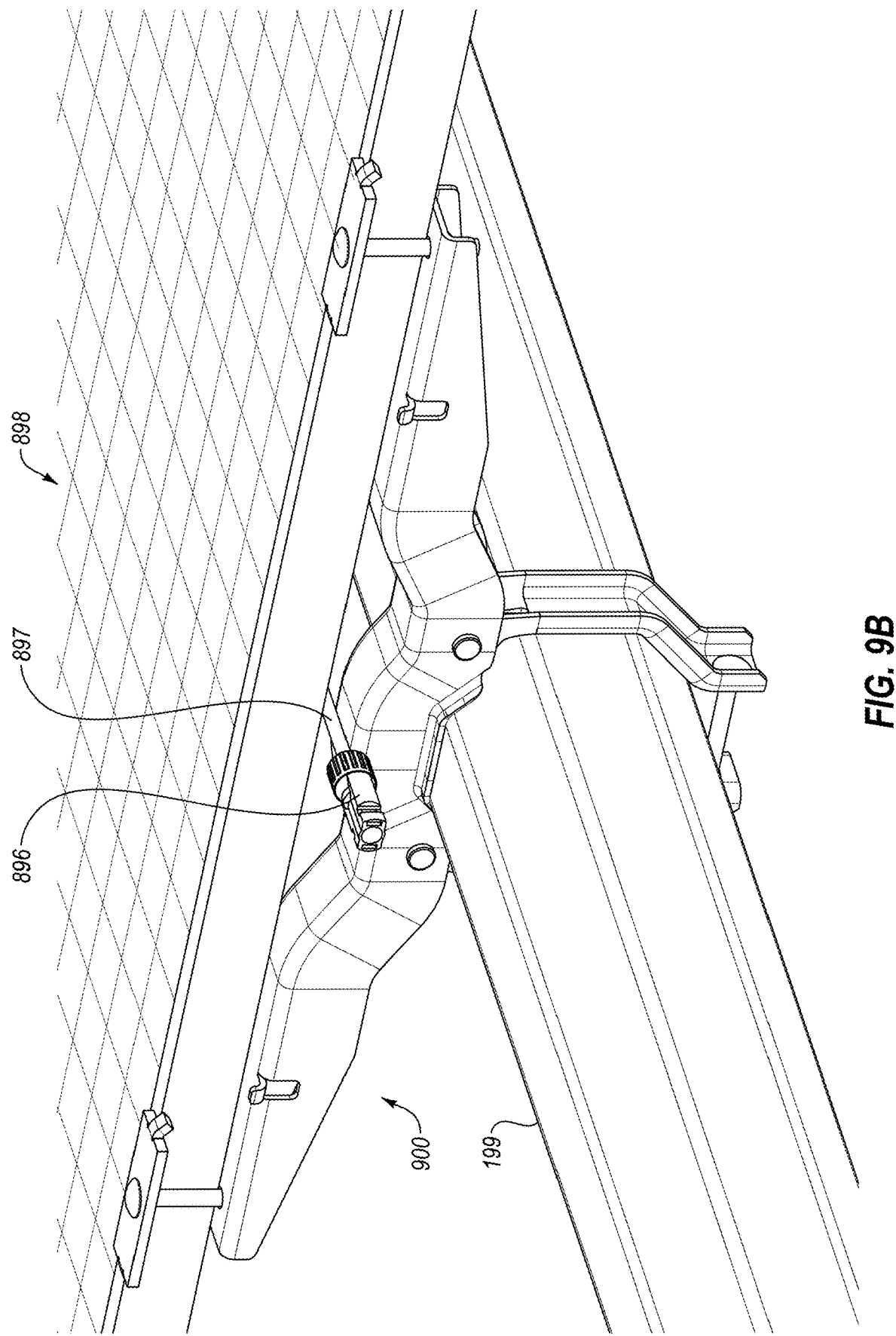

FIGS. 9A and 9B illustrate an example of an additional example embodiment of a mounting bracket assembly 900 in accordance with the present disclosure. FIG. 9A illustrates a front view of the mounting bracket assembly 900, and FIG. 9B illustrates a perspective view of the mounting bracket assembly 900 with a PV module 898 coupled to the mounting bracket assembly 900 and a torsion beam 199. FIG. 9B also illustrates a plug 896 and cord 897 associated with the PV module 898. The mounting bracket assembly 900 may utilize a U-bolt 930 or other attachment device to couple mounting bracket assembly 900 to the torsion beam 199. For example, the U-bolt 930 may enclose a hole 950 through which the torsion beam may pass.

As illustrated in FIG. 9A, the mounting bracket assembly 900 may include two arms 915a and 915b for interfacing with the PV module 898. For example, the PV module 898 may be bolted to the arms 915a and 915b. Between the arms 915a/b are two troughs 925a/925b and a peak 905. The peak 905 may be lower than the frame of the PV module 898 (for example, as illustrated in FIG. 9B). For example, the arms 915a/b may be at a Height 1 that is met by the frame of the PV module 898, the peak 905 may be at a Height 2, and the troughs 925 may be at a Height 3. The difference between the Height 1 and Height 2 may be sized to accommodate the cord 897 but may not be large enough to accommodate the plug 896. The difference between the Height 1 and Height 3 may be sized to accommodate the cord 897 and/or the plug 896. When installing and/or otherwise working with the cord 897 and/or the plug 896, the plug 896 may be able to traverse parallel to the torsion beam 199 past the mounting bracket assembly 900 through one of the troughs 925*a/b*, while the cord 897 may still fit between the peak 905 and the frame of the PV module 898. By doing so, excess material and/or slack in the cord 897 may be reduced while permitting installation, replacement, etc. without removing the PV module 898 from the mounting bracket assembly 900 because the trough 925 is sized to permit the plug 896 to pass therethrough.

By utilizing the peak 905, the portion of the mounting bracket assembly 900 that experiences some of the highest strain may have increased material thickness. For example, when using a U-bolt such as the U-bolt 930 to couple the PV module 898 to the torsion beam 199 via the mounting bracket assembly 900, many of the stresses are in the region of the peak 905. By using the peak 905 and the troughs 925, the cord 897 is still able to traverse past the mounting bracket assembly 900 while having an increased thickness in the mounting bracket assembly 900 where the highest stress is experienced (proximate the top of the torsion beam 199) and permitting the plug 896 to still progress past the mounting bracket assembly 900 parallel to the torsion beam 199.

In some embodiments, the concept of the peak 905 and the troughs 925 may be applied to any embodiments of the present disclosure, or any other embodiments of mounting bracket assemblies. For example, the mounting bracket assembly 100 of FIGS. 1, 2A, 3, 4A-4B, and 5 may include a profile in which the central portion extends upward in a peak in the lower portion where a cord may fit between the peak and the frame of the PV module, and may leave troughs on either side of the peak where a plug may also fit. As another example, the mounting bracket assembly 600 of FIG. 6 may include a peak associated with the central portion through which a cord may fit, with troughs at the interfaces 640 or in the modular components 620/630 through which a plug may also fit. As a further example, the hole 850*a* may be shaped with a peak and troughs, effectively increasing the material in the narrow neck 875.

Figure 10A:
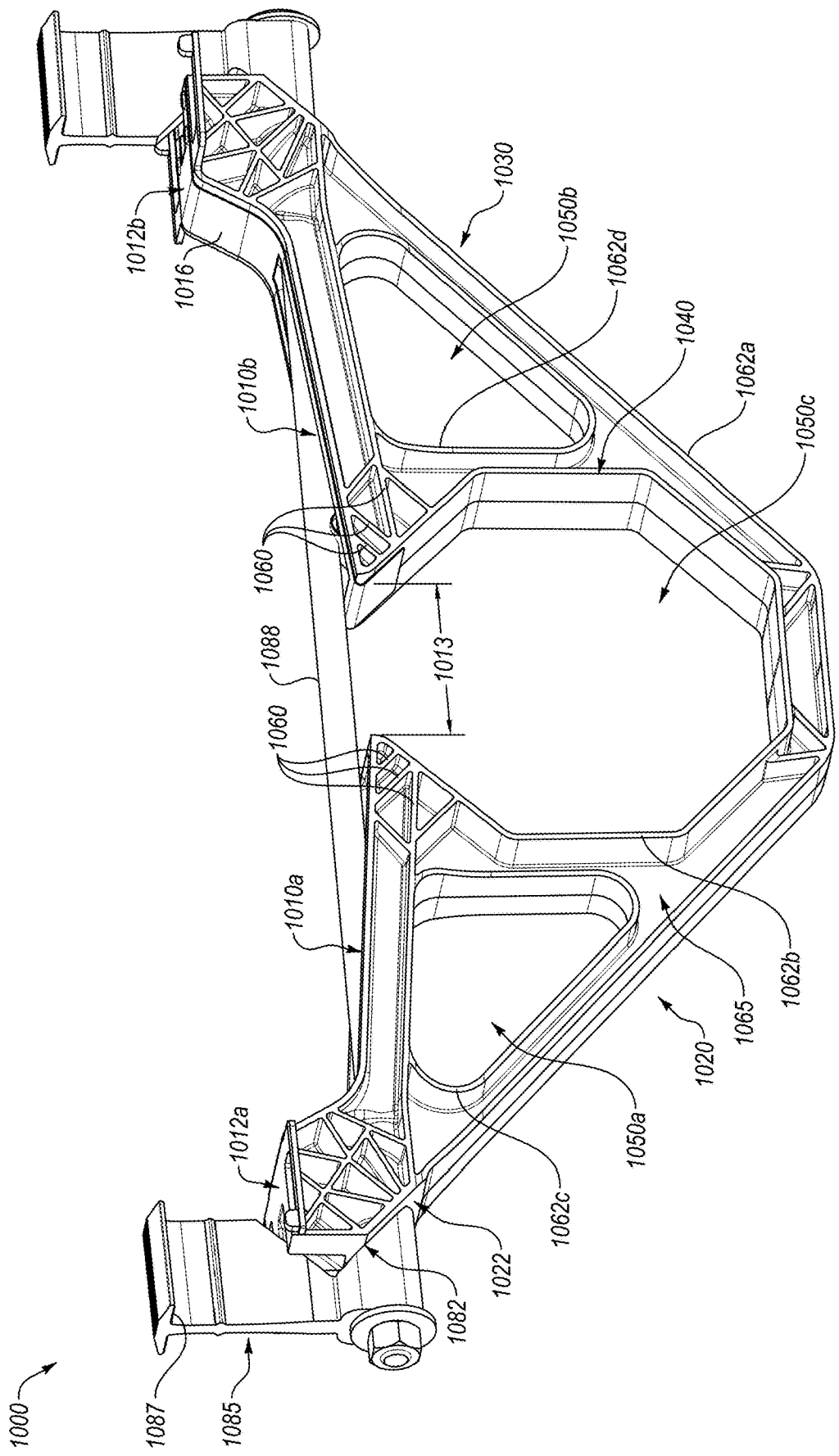
FIGS. 10A and 10B illustrate various views of a further example embodiment of a mounting bracket assembly in accordance with the present disclosure.
Figure 10B:
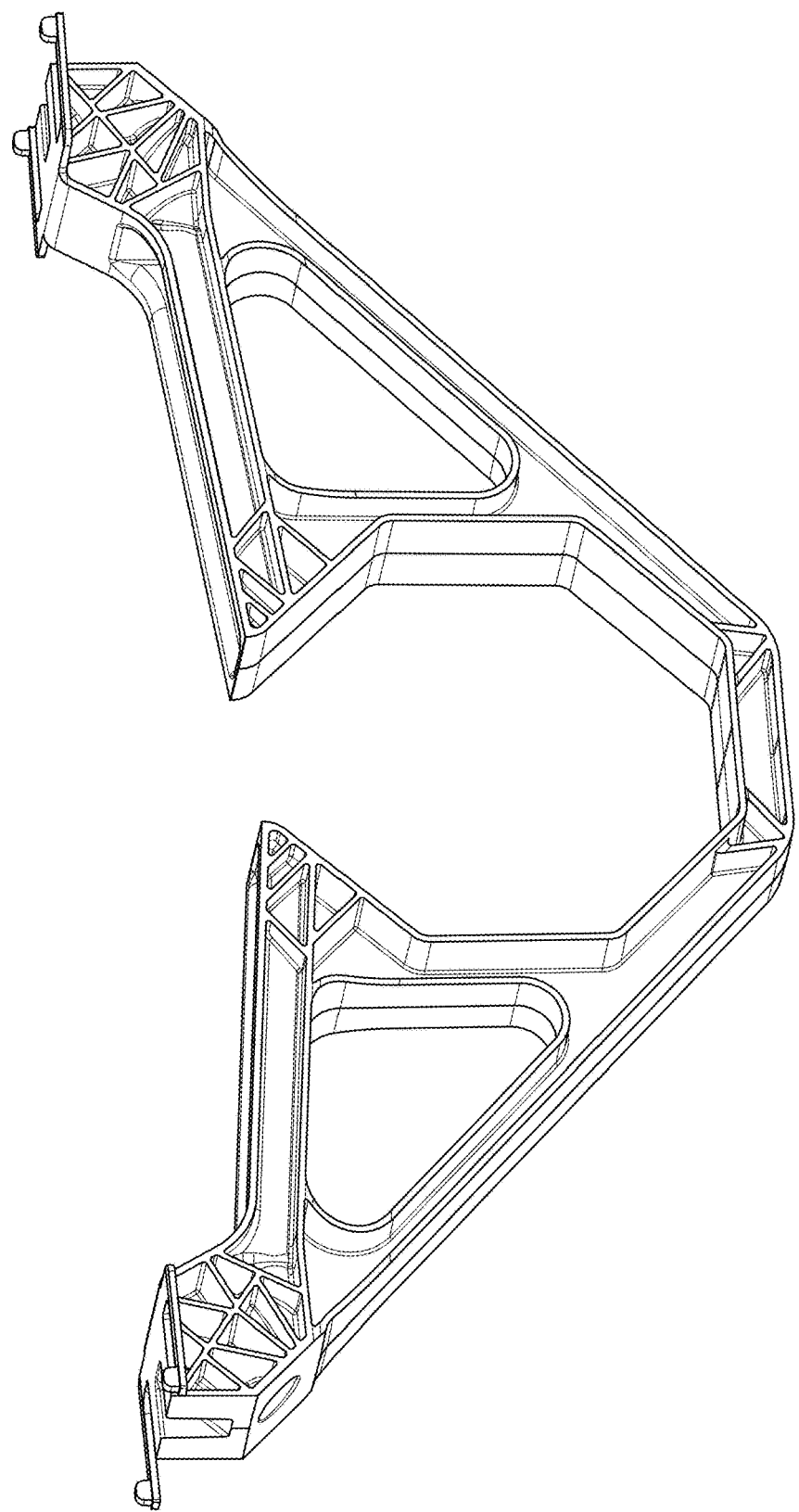

FIGS. 10A and 10B illustrate various views of a further example embodiment of a mounting bracket assembly 1000 in accordance with the present disclosure. The mounting bracket assembly 1000 may be similar or comparable to the mounting bracket assembly 100 of FIG. 1. For example, the mounting bracket assembly 1000 may be made of a flexible material and may provide one or more of the benefits and/or features described with reference to the mounting bracket assembly 100 of FIG. 1. The mounting bracket assembly 1000 may include top portions 1010*a* and 1010*b* on either side of the mounting bracket assembly 1000, a first side portion 1020, a second side portion 1030, and a central portion 1040. The top regions 1010*a*/101*b*, the first side portion 1020, the second side portion 1030, and/or the central portion 1040 may create one or more holes 1050*c* in the mounting bracket assembly 1000. The mounting bracket assembly 1000 may be reinforced by one or more ribs 1060, and an internal web 1065 may extend between the ribs 1060 and an outer lining 1062 of the mounting bracket assembly 1000 (such as the outer linings 1062*a*, 1062*b*, 1062, and/or 1062*d*). The central portion 1040 may circumscribe the hole 150*c* through which a torsion beam 199 may be disposed.

In some embodiments, the mounting bracket assembly 1000 be changed or deformed, such as by decreasing the size of a hole 1050*c* thereby tightening the mounting bracket assembly 1000 to a torsion beam. For example, the mounting bracket assembly 1000 may include an eared clamp 1085 at either end of the mounting bracket assembly 1000. The eared clamp 1085 may include one or more ears 1087 atop the eared clamp 1085 that may apply a downward force against a PV module to pinch the PV module against a flat portion 1012 (such as the flat portions 1012*a* and/or 1012*b*) to secure the PV module into place.

In operation, to cause the eared clamp 1085 to move downward, a single bolt 1088 may be tightened. As the bolt 1088 is tightened, a sloping surface 1082 of the eared clamp 1085 may interface with a sloping surface 1022 of the side portion 1020. As the bolt is tightened, the eared clamp 1085 slides down an outer surface of the side portion 1020, thereby lowering the eared clamp 1085 relative to the flat portion 1012*a* against which the PV module may be resting, thereby pinching the PV module between the ears 1087 of the eared clamp 1085 and the flat portion 1012*a*. While described with reference to one end of the mounting bracket assembly 1000, it will be appreciated that a second eared clamp may be disposed on the opposite end of the mounting bracket assembly 1000 such that as the single bolt 1088 is tightened, both eared clamps may be drawn down simultaneously.

In some embodiments, as the single bolt 1088 is tightened, it also causes a deformation of the mounting bracket assembly 1000 such that the upper portions 1010*a* and 1010*b* are drawn towards each other, reducing a gap 1013 between the upper portions 1012*a* and 1012*b*. By reducing the gap 1013, the effective circumference of the hole 1050*c* may be reduced, causing the mounting bracket assembly 1000 to be tightened about a torsion beam projecting through the hole 1050*c*. In these and other embodiments, tightening the single bolt may thus both tighten the mounting bracket assembly 1000 about the torsion beam but also draw both eared clamps 1085 downward to pinch the PV modules against the mounting bracket assembly 1000.

In some embodiments, the mounting bracket assembly 1000 may include a grounding strip 1016. For example, the grounding strip may 1016 may extend from the top surface 1012*b* along the upper portion 1010*b* and into the hole 1050*c*. By doing so, the PV module frame may be electrically coupled to the torsion beam. In these and other embodiments, the grounding strip 1016 may include one or more features (e.g., barbs, hooks, teeth, blades, protrusions, etc.) for biting through an anodized coating of the PV module frame and/or the torsion beam. In some embodiments, the grounding strip 1016 may be cast or molded into the mounting bracket assembly 1000 rather than being disposed along the surface thereof.

In addition to the hole 1050*c*, the mounting bracket assembly 1000 may include other holes such as the holes 1050*a* and 1050*b* to provide a reduction in material requirements and/or a better distribution of forces. For example, the holes 1050*a* and/or 1050*b* may take a generally triangular shape following the upper portion 1010*a*, the side portion 1020, and the central portion 1040.

Modifications, additions, or omissions may be made to FIGS. 10A and 10B of the present disclosure. For example, changes as described herein may be made in accordance with the knowledge of a person of ordinary skill in the art. For example, the mounting bracket assembly 1000 may be of various lengths. Additionally or alternatively, the mounting bracket assembly 1000 may include module locating tabs.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Relative terms used in the present disclosure and especially in the appended claims (e.g., bodies of the appended claims) are generally intended as falling within manufacturing tolerances and/or within scope reasonably understood by a person of skill in the art. For example, if two components are identified as being the "same" size, there may be variations consistent with manufacturing variances. Terms describing "approximately," "similar," "substantially," or other terms designating similarity may convey within ten percent of the comparative value. For example, two components that are approximately the same size would be understood to be of a size within ten percent of each other.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A mounting bracket assembly comprising:
    an upper region with a continuous top surface, the top surface including flat portions on either end that are configured to interface with a photovoltaic (PV) module and a lower portion in between the flat portions such that a gap exists between the continuous top surface and the PV module at the lower portion when the PV module is mounted using the mounting bracket assembly, wherein the upper region is made of a nonconductive material;
    a first conductive component that is exposed along at least one of the flat portions on the top surface, the first conductive component being configured to make contact with a conductive component on the PV module when the PV module is mounted using the mounting bracket assembly;
    a central portion at least partially surrounding a hole shaped to accommodate a torsion beam, wherein the central portion is made of a nonconductive material;
    a second conductive component that is exposed within the hole shaped to accommodate the torsion beam, the second conductive component being configured to make contact with the torsion beam when mounted thereto;
    a third conductive component electrically connecting the first conductive component with the second conductive component;
    side portions extending from the ends of the upper region to below the hole shaped to accommodate the torsion beam, wherein the side portions are made of a nonconductive material;
    a plurality of ribs extending between the upper region, the central portion, and the side portions, wherein the plurality of ribs is made of a nonconductive material.

2. The mounting bracket assembly of claim 1, further comprising first metal sleeves within the flat portions, shaped and positioned to accommodate bolts for coupling the mounting bracket assembly to the PV module.

3. The mounting bracket assembly of claim 1, further comprising a second metal sleeve within the side portions, shaped and positioned to accommodate at least one bottom bolt for coupling the mounting bracket assembly to the torsion beam.

4. The mounting bracket assembly of claim 1, wherein bottom ends of the side portions meet with bottom ends of the central portion to form a gap in the hole below the central portion.

5. The mounting bracket assembly of claim 1, further comprising a tool-less fastener disposed at bottom ends of the side portions below the central portion, wherein the tool-less fastener is configured to selectively reduce a distance between the bottom ends of the side portions.

6. The mounting bracket assembly of claim 5, wherein the tool-less fastener includes a post and cam locking mechanism.

7. A system, comprising:
a plurality of photovoltaic (PV) modules positioned along a plurality of rows and coupled to a torsion beam for each of the plurality of rows, each of the plurality of rows movable via a motor to adjust an orientation of the torsion beam and thereby an orientation of a given row of the plurality of rows of PV modules; and
a plurality of mounting bracket assemblies for coupling the PV modules to the torsion beams, each of the plurality of mounting bracket assemblies comprising:
an upper region with a continuous top surface, the top surface including flat portions on either end that interface with a PV module and a lower portion in between the flat portions such that a gap exists between the continuous top surface and the PV module at the lower portion when the PV module is mounted using the mounting bracket assembly, wherein the upper region is made of a nonconductive material;
a first conductive component that is exposed along at least one of the flat portions on the top surface, the first conductive component being configured to make contact with a conductive component on the PV module when the PV module is mounted using the mounting bracket assembly;
a central portion at least partially surrounding a hole shaped to accommodate the torsion beam, wherein the central portion is made of a nonconductive material;
a second conductive component that is exposed within the hole shaped to accommodate the torsion beam, the second conductive component being configured to make contact with the torsion beam when mounted thereto;
a third conductive component electrically connecting the first conductive component with the second conductive component;
side portions extending from the ends of the upper region to below the hole shaped to accommodate the torsion beam, wherein the side portions are made of a nonconductive material; and
a plurality of ribs extending between the upper region, the central portion, and the side portions, wherein the plurality of ribs is made of a nonconductive material.

8. The system of claim 7, further comprising first metal sleeves within the flat portions, shaped and positioned to accommodate bolts for coupling the mounting bracket assembly to the PV module.

9. The system of claim 7, further comprising a second metal sleeve within the side portions, shaped and positioned to accommodate at least one bottom bolt for coupling the mounting bracket assembly to the torsion beam.

10. The system of claim 7, wherein bottom ends of the side portions meet with bottom ends of the central portion to form a gap in the hole below the central portion.

11. The system of claim 7, further comprising a tool-less fastener disposed at bottom ends of the side portions below the central portion, wherein the tool-less fastener is configured to selectively reduce a distance between the bottom ends of the side portions.

12. The system of claim 11, wherein the tool-less fastener includes a post and cam locking mechanism.

* * * * *